United States Patent
Zhu et al.

(10) Patent No.: US 10,638,321 B2
(45) Date of Patent: Apr. 28, 2020

(54) WIRELESS NETWORK CONNECTION METHOD AND APPARATUS, AND STORAGE MEDIUM

(71) Applicant: TENCENT TECHNOLOGY (SHENZHEN) COMPANY LIMITED, Shenzhen (CN)

(72) Inventors: Ge Zhu, Shenzhen (CN); Wenning Tang, Shenzhen (CN); Zhiwei Yang, Shenzhen (CN); Huoping Fu, Shenzhen (CN); Shuiming Chen, Shenzhen (CN); Sensheng Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 15/913,644

(22) Filed: Mar. 6, 2018

(65) Prior Publication Data

US 2018/0199205 A1    Jul. 12, 2018

Related U.S. Application Data

(63) Continuation of application No. PCT/CN2017/072186, filed on Jan. 23, 2017.

(30) Foreign Application Priority Data

Jan. 29, 2016  (CN) .......................... 2016 1 0067779
Jan. 29, 2016  (CN) .......................... 2016 1 0067787

(51) Int. Cl.
*H04L 29/06*     (2006.01)
*H04W 12/08*     (2009.01)
(Continued)

(52) U.S. Cl.
CPC ............ *H04W 12/08* (2013.01); *H04L 9/083* (2013.01); *H04L 9/0825* (2013.01);
(Continued)

(58) Field of Classification Search
CPC ...... H04W 12/04; H04W 12/06; H04W 12/08; H04W 48/16; H04L 9/08; H04L 9/14;
(Continued)

(56) References Cited

U.S. PATENT DOCUMENTS 6,453,159 B1 * 9/2002 Lewis ................. H04L 63/0428
                                                    455/411
8,249,256 B2 * 8/2012 Korus .................. H04L 63/064
                                                    370/331
(Continued)

FOREIGN PATENT DOCUMENTS

CN       101212296       7/2008
CN       101232378       7/2008
(Continued)

OTHER PUBLICATIONS

International Search Report dated Apr. 13, 2017 in PCT/CN2017/072186 filed Jan. 23, 2017.
(Continued)

*Primary Examiner* — Hosuk Song
(74) *Attorney, Agent, or Firm* — Oblon, McClelland, Maier & Neustadt, L.L.P.

(57) ABSTRACT

Embodiments of this application relate to the field of network security, and disclose a wireless network connection method, apparatus, and system. A method for establishing wireless network connection includes receiving, by an authorization server, an access request sent by a radio access point. The access request carries user information of a user terminal that attempts to access the radio access point. The method then includes determining whether the radio access point is a trusted radio access point, performing a first identity authentication on the user terminal when the radio access point is determined to be the trusted radio access point, generating a master key for the user terminal based on the user information, sending the master key to the user terminal when the first identity authentication succeeds and sending the master key to the radio access point.

33 Claims, 19 Drawing Sheets

(51) Int. Cl.
*H04W 12/06* (2009.01)
*H04L 9/08* (2006.01)
*H04W 12/02* (2009.01)
*H04L 9/32* (2006.01)
*H04L 9/14* (2006.01)
*H04W 12/04* (2009.01)
*H04W 84/12* (2009.01)
*H04W 48/16* (2009.01)

(52) U.S. Cl.
CPC ............. *H04L 9/0894* (2013.01); *H04L 9/14* (2013.01); *H04L 9/321* (2013.01); *H04L 63/0442* (2013.01); *H04L 63/0823* (2013.01); *H04W 12/02* (2013.01); *H04W 12/04* (2013.01); *H04W 12/06* (2013.01); *H04L 2209/80* (2013.01); *H04W 48/16* (2013.01); *H04W 84/12* (2013.01)

(58) Field of Classification Search
CPC . H04L 63/0442; H04L 63/0869; H04L 63/08; H04L 2209/80
See application file for complete search history.

(56) References Cited

U.S. PATENT DOCUMENTS

| | | | | |
|---|---|---|---|---|
| 8,473,002 | B2* | 6/2013 | Escott | H04L 63/0823 455/552.1 |
| 8,798,632 | B2* | 8/2014 | Forsberg | H04L 63/06 455/439 |
| 8,886,935 | B2* | 11/2014 | Ohba | H04L 9/0891 380/277 |
| 9,801,099 | B2* | 10/2017 | Gage | H04W 12/04 |
| 2009/0214036 | A1 | 8/2009 | Shen et al. | |
| 2011/0167270 | A1* | 7/2011 | Lee | H04L 9/0869 713/170 |
| 2014/0050320 | A1 | 2/2014 | Choyi et al. | |

FOREIGN PATENT DOCUMENTS

| | | |
|---|---|---|
| CN | 101282215 | 10/2008 |
| CN | 101448262 | 6/2009 |
| CN | 103024743 | 4/2013 |
| CN | 104244248 | 12/2014 |
| CN | 104394533 | 3/2015 |
| CN | 105554747 | 5/2016 |
| CN | 105554760 | 5/2016 |
| EP | 2 418 883 A1 | 2/2012 |
| KR | 10-1038096 | 6/2011 |
| WO | 2015042471 | 3/2015 |

OTHER PUBLICATIONS

Office Action dated Jan. 11, 2018 in Chinese Patent Application No. 201610067787.2 (With concise translation).
Office Action dated Feb. 27, 2018 in Chinese Patent Application No. 201610067787.2 (With concise translation).
Korean Office Action dated Jan. 10, 2020 in Korean Application No. 10-2018-7020181, with English translation, 5 pages.
European Office Action dated Nov. 23, 2018 in European Application No. 17743704.3, 1 page.
Extended European Search Report dated Nov. 6, 2018 in European Application No. 17743704.3, 10 pages.
Menezes, A.J., et al., Chapter 13: Key Management Techniques ED, Handbook of Applied Cryptography, [CRC Press Series on Discrete Mathematics and it's Applications] CRC Press Boca Raton, FL, US, (Oct. 1, 1996) XP001525013, ISBN: 978-0-8493-8523-0, 49 pages.

* cited by examiner

WIRELESS NETWORK CONNECTION METHOD AND APPARATUS, AND STORAGE MEDIUM

RELATED APPLICATION

This application is a continuation of International Application No. PCT/CN2017/072186, filed on Jan. 23, 2017, which claims priority to Chinese Patent Application No. 201610067787.2, entitled "WIRELESS NETWORK CONNECTION METHOD AND APPARATUS, AND STORAGE MEDIUM" filed on Jan. 29, 2016, and Chinese Patent Application No. 201610067779.8, entitled "WIRELESS NETWORK CONNECTION METHOD AND APPARATUS, AND STORAGE MEDIUM" filed on Jan. 29, 2016. The entire disclosures of the prior applications are hereby incorporated by reference in their entirety.

FIELD OF THE TECHNOLOGY

Embodiments of this application relates to the field of network security, and in particular, to a wireless network connection method and apparatus, and a storage medium.

BACKGROUND OF THE DISCLOSURE

As user terminals are widely used, a wireless network becomes an important form in which the user terminals access the Internet. Usually, the wireless network is a Wi-Fi network. Currently, most commercial places provide public Wi-Fi to users for free use.

In the related technology, the user terminal accesses public Wi-Fi mainly in the following manners: an access manner using no password, an access manner using a verification code, and an access manner using a single password. In the access manner using no password, after obtaining a service set identifier (SSID) of the public Wi-Fi, the user terminal sends an access request to a radio access point, and the radio access point directly allows, without the need to perform verification, the user terminal to access the public Wi-Fi. In the access manner using a verification code, the user terminal needs to obtain an SSID of the public Wi-Fi and a verification code when accessing the public Wi-Fi, and sends an access request to the radio access point by using the verification code and the SSID. The radio access point verifies the verification code and the SSID, and allows, after the verification succeeds, the user terminal to access the public Wi-Fi. The verification code usually has a validity period, for example, 60 s. In the access manner using a single password, to access the public Wi-Fi, the user terminal obtains in advance an SSID and a connection password of the public Wi-Fi, and sends an access request to the radio access point by using the SSID and the connection password. The radio access point verifies the SSID and the connection password, and allows, after the verification performed by the radio access point succeeds, the user terminal to access the public Wi-Fi. The connection password is usually permanently valid.

SUMMARY

To resolve a problem that both data transmitted by a user terminal to fake public Wi-Fi and data within the user terminal are under security threats when a user causes, by using a related access method, the user terminal to access the fake public Wi-Fi, embodiments of this application provide a wireless network connection method, apparatus, and system. The technical solutions are as follows:

Aspects of the disclosure provide a method for establishing a wireless network connection. The method includes receiving, by processing circuitry of an authorization server, an access request sent by a radio access point. The access request carries user information of a user terminal that attempts to access the radio access point. The method then includes determining whether the radio access point is a trusted radio access point, performing a first identity authentication on the user terminal when the radio access point is determined to be the trusted radio access point, generating a master key for the user terminal based on the user information, sending the master key to the user terminal when the first identity authentication succeeds and sending the master key to the radio access point. The radio access point negotiates with the user terminal according to the master key to establish an encrypted wireless network connection.

In some embodiments, to determine whether the radio access point is the trusted radio access point, the method includes obtaining a first ciphertext carried in the access request and a first public key being associated with the radio access point. The first public key is paired with a first private key associated with the radio access point. The method further includes checking whether the first public key exists in a set of trusted public keys, and determining that the radio access point is the trusted radio access point when the first public key exists in the set of trusted public keys. The set of trusted public keys stores public keys associated with radio access points that are authenticated by second identity authentications.

In some embodiments, to obtain the first ciphertext carried in the access request and the first public key, the method includes decrypting the access request by using a second private key associated with the authentication server to obtain the first ciphertext and the first public key. The second private key is paired with a second public key associated with the authentication server; and the access request has been encrypted using the second public key associated with the authentication server.

In some embodiments, to perform the first identity authentication on the user terminal when the radio access point is determined to be the trusted radio access point, the method includes decrypting the first ciphertext carried in the access request by using the first public key when the radio access point is determined to be the trusted radio access point, to obtain the user information, querying key information associated with the user information, and performing the first identity authentication on the user terminal according to the key information. The first ciphertext is generated at the radio access point by encrypting the user information using the first private key associated with the radio access point.

In some examples, the method includes encrypting the master key using the first public key associated with the radio access point to generate a first encrypted master key; and sending the first encrypted master key to the radio access point.

To send the first encrypted master key to the radio access point, in some embodiments, the method includes encrypting the first encrypted master key using a second private key associated with the authentication server to generate a second encrypted master key and sending the second encrypted master key to the radio access point.

In some embodiments, before receiving the access request sent by the radio access point, the method includes receiving an identity authentication request sent by the radio access point. The identity authentication request carries authentication information and a first public key associated with the radio access point, both the authentication information and the first public key are encrypted by using a second public key associated with the authentication server, the first public key is paired with a first private key associated with the radio access point, the second public key is paired with a second private key associated with the authentication server, and the authentication information includes at least hardware information and/or owner information. The method further includes decrypting the identity authentication request by using the second private key associated with the authentication server, to obtain the authentication information and the first public key, performing the second identity authentication on the authentication information; and adding the first public key to a set of trusted public keys when the second identity authentication succeeds.

Further, in some embodiments, the authentication information is generated at the radio access point by an encryption using the first private key associated with the radio access point. To perform the second identity authentication on the authentication information, the method includes decrypting the authentication information by using the first public key, to obtain the hardware information and/or the owner information, performing the second identity authentication on the hardware information and/or the owner information, and adding the first public key to the set of trusted public keys when the second identity authentication succeeds.

In some embodiments, the method includes receiving first information sent by the radio access point. The first information includes hardware information of the radio access point and a first public key associated with the radio access point. The first public key is paired with a first private key associated with the radio access point. The method further includes receiving second information sent by a management terminal. The second information includes the hardware information of the radio access point and owner information of the radio access point. The method then includes performing identity authentication based on the hardware information and the owner information after the second information is received, adding the radio access point to a list of trusted radio access points when the identity authentication succeeds, and storing, at the authorization server, the first public key associated with the radio access point.

To receive the first information sent by the radio access point, the method includes receiving the first information and a first signature that are sent by the radio access point. The first signature is generated at the radio access point by signing the first information using the first private key associated with the radio access point. In some embodiments, the first information further includes a first random number. Then, after receiving the first information and the first signature that are sent by the radio access point, the method includes generating feedback information that includes a second random number and a second public key associated with the authentication server. The second public key is paired with a second private key associated with the authentication server. The method further includes generating, at the authentication server, a second signature by signing the feedback information using the second private key, sending the feedback information and the second signature to the radio access point, performing a calculation according to the first random number, the second random number, and the first public key associated with the radio access point, to obtain a first key, and encrypting, by using the first key, information sent to the radio access point.

In some embodiments, after adding the radio access point to the list of trusted radio access points, the method includes receiving a request for authenticated networks that is sent by the management terminal, and obtaining a list of trusted service set identifiers (SSIDs) as a list of the authenticated networks. The trusted SSIDs are provided by the trusted radio access points. The method then includes sending the list of authenticated networks to the management terminal.

In some examples, after sending the list of authenticated networks to the management terminal, the method further includes receiving a binding cancellation request sent by the management terminal, the binding cancellation request comprising a trusted SSID, and deleting the trusted SSID from the list of authenticated networks according to the binding cancellation request.

Aspects of the disclosure provide a method for accessing a wireless network. The method includes receiving, at a radio access point, a first access request sent by a user terminal. The first access request carries user information of the user terminal. Then, the method includes sending, from the radio access point, a second access request to an authentication server. The second access request carries the user information. Then, the method includes receiving a master key sent by the authentication server. The master key is associated with the user information and is generated for the user terminal by the authentication server in response to the second access request, when the radio access point is determined to be a trusted radio access point, and a first identity authentication on the user terminal succeeds. Further, the method includes negotiating with the user terminal according to the master key to establish an encrypted wireless network connection.

To receive the master key sent by the authentication server, in some embodiments, the method includes receiving a first encrypted master key sent by the authentication server. The authentication server encrypts the master key using a first public key associated with the radio access point to generate the first encrypted master key, the first public key is paired with a first private key associated with the radio access point.

Further, in some embodiments, the method includes receiving a second encrypted master key sent by the authentication server. The authentication server encrypts the master key using a first public key associated with the radio access point to generate a first encrypted master key and encrypts the first encrypted master key using a second private key associated with the authentication server to generate the second encrypted master key. The first public key is paired with a first private associated with the radio access point, and the second private key is paired with a second public key associated with the authentication server.

Thus, in some embodiments, to negotiate with the user terminal according to the master key to establish the encrypted wireless network connection, the method includes decrypting, at the radio access point, the first encrypted master key using the first private key associated with the radio access point, to obtain the master key, and negotiating with the user terminal according to the master key to establish the encrypted wireless network connection.

In some other embodiments, to negotiate with the user terminal according to the master key to establish the encrypted wireless network connection, the method includes decrypting the second encrypted master key using the second public key associated with the authentication server, to obtain the first encrypted master key, decrypting the first encrypted master key by using the first private key associated with the radio access point, to obtain the master key, and negotiating with the user terminal according to the master key to establish the encrypted wireless network connection.

In some examples, before sending the second access request to the authentication server, the method includes generating, at the radio access point, a pair of a first public key and a first private key associated with the radio access point, obtaining a second public key associated with the authentication server, and sending an identity authentication request to the authentication server. The identity authentication request carries authentication information and the first public key associated with the radio access point. Both the authentication information and the first public key corresponding to the radio access point are encrypted using the second public key associated with the authentication server, and the authentication information includes at least hardware information and/or owner information. In an example, the authentication information is encrypted using the first private key associated with the radio access point.

In some embodiments, to negotiate with the user terminal according to the master key to establish the encrypted wireless network connection, the method includes negotiating with the user terminal by using the master key to establish a temporary key for a connection session, and establishing the encrypted wireless network connection to the user terminal according to the temporary key.

Aspects of the disclosure provide an apparatus, such as an authorization server. The apparatus includes interface circuitry and processing circuitry. The interface circuitry is configured to receive signals from and transmit signals to a radio access point and a user terminal via a network. The processing circuitry is configured to receive, via the interface circuitry, an access request sent by the radio access point. The access request carries user information of the user terminal attempting to access the radio access point. The processing circuitry is further configured to determine whether the radio access point is a trusted radio access point after the access request is received, and perform a first identity authentication on the user terminal when the radio access point is determined to be the trusted radio access point. When the user terminal is authenticated by the first identify authentication, the processing circuitry is configured to generate a master key for the user terminal based on the user information, send, via the interface circuitry, the master key to the user terminal, and send, via the interface circuitry, the master key to the radio access point. The radio access point negotiates with the user terminal according to the master key to establish an encrypted wireless network connection.

Aspects of the disclosure provide an apparatus, such as a radio access point. The apparatus includes first interface circuitry configured to receive wireless signals from and transmit wireless signals to a user terminal, second interface circuitry configured to receive signals from and transmit signals to an authentication server via a network; and processing circuitry. The processing circuitry is configured to receive, via the first interface circuitry, a first access request sent by the user terminal. The first access request carries user information of the user terminal. The processing circuitry is further configured to send, via the second interface circuitry, a second access request to the authentication server. The second access request carries the user information. The processing circuitry is then configured to receive, via the second interface circuitry, a master key sent by the authentication server. The master key is associated with the user information and is generated for the user terminal by the authentication server in response to the second access request when the apparatus is determined to be a trusted radio access point, and the user terminal is authenticated by a first identity authentication. Then, the processing circuitry is configured to negotiate, via the first interface circuitry, with the user terminal according to the master key to establish an encrypted wireless network connection.

Aspects of the disclosure provide a non-transitory computer-readable medium storing instructions which when executed by a processor of an authorization server, causes the processor to perform a method for establishing a wireless network connection. The method includes receiving an access request sent by a radio access point. The access request carries user information of a user terminal attempting to access the radio access point. The method then includes determining whether the radio access point is a trusted radio access point after the access request is received, and performing a first identity authentication on the user terminal when the radio access point is determined to be the trusted radio access point. When the user terminal is authenticated by the first identify authentication, the method includes generating a master key for the user terminal based on the user information, sending the master key to the user terminal, and sending the master key to the radio access point. The radio access point then negotiates with the user terminal according to the master key to establish an encrypted wireless network connection.

Aspects of the disclosure provide a non-transitory computer-readable medium storing instructions which when executed by a processor of a radio access point, causes the processor to perform a method for establishing a wireless network connection. The method includes receiving a first access request sent by a user terminal. The first access request carries user information of the user terminal. The method further includes sending a second access request to an authentication server. The second access request carries the user information. The method further includes receiving a master key sent by the authentication server. The master key is associated with the user information and is generated for the user terminal by the authentication server in response to the second access request, when the radio access point is determined to be a trusted radio access point, and the user terminal is authenticated by a first identity authentication. Then the method includes negotiating with the user terminal according to the master key to establish an encrypted wireless network connection.

Identity authentication is performed on a radio access point by using an authentication server, and a trusted radio access point can obtain a master key corresponding to user information, and therefore, establish an encrypted wireless network connection with a user terminal according to the master key. This improves security of both data transmitted by the user terminal and data within the user terminal.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

Figure 1A:
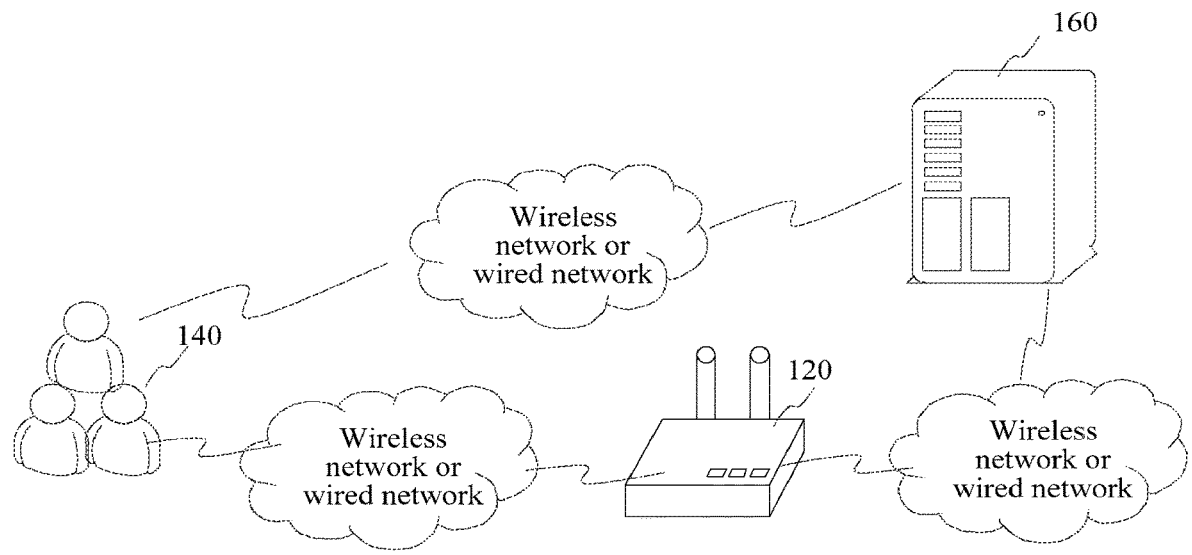
FIG. 1A is a schematic structural diagram of a wireless network connection system according to an embodiment of this application.

For brief and intuitive description, the following describes the solutions of this application by describing several typical embodiments. However, not all implementations are shown herein. Details in the embodiments are used merely for helping understand the solutions of this application, and implementations of the technical solutions of this application may not be limited by these details. To avoid making the solutions of this application obscure, some implementations are not described in detail, but a framework is provided. In the following descriptions, "including" means "including but not limited to", and "according to . . . " means "at least according to . . . , but the basis is not limited to . . . ". "Including/comprising" in the specification and the claims means at least including/comprising to some extent, and is construed as including/comprising other features in addition to features mentioned below.

For ease of understanding, some technical concepts involved in the embodiments of this application are first described.

Public Key and Private Key

A public key refers to a key that is public, does not need to be kept confidential, and may be obtained by a decrypting party by various means. A private key refers to a key that is held by an encrypting part and needs to be kept confidential. One public key corresponds to one private key, and the public key and the private key jointly form an asymmetrical encryption manner. In the asymmetrical encryption manner, information encrypted by using the public key can be decrypted by using the corresponding private key, and information encrypted by using the private key can be decrypted by using the corresponding public key. That is, different keys are used for encryption and decryption.

For example, it is assumed that A intends to send encrypted information to B. A first needs to obtain a public key corresponding to B, then encrypts to-be-sent information by using the public key corresponding to B, and sends the encrypted information to B. After receiving the encrypted information sent by A, B needs to use a private key corresponding to B to decrypt the encrypted information, to obtain content in the encrypted information. Because only B has the private key corresponding to B, the encrypted information sent by A is secure.

Encryption and Signature

Encryption means that a sender encrypts to-be-sent data by using a public key corresponding to a receiver, and the receiver can decrypt the received encrypted data by using a private key corresponding to the receiver, to obtain the data sent by the sender; or a sender encrypts to-be-sent data by using a private key corresponding to the sender, and a receiver can decrypts the received encrypted data by using a public key corresponding to the sender, to obtain the data sent by the sender. The encryption is used for preventing data leakage, and content of the data can be obtained through decryption by using the private key corresponding to the public key.

A signature means that a sender signs to-be-sent data by using a private key corresponding to the sender, where the sender calculates the to-be-sent data by using a hash function to obtain an information synopsis, encrypts, by using the private key corresponding to the sender, the information synopsis obtained through calculation, uses the encrypted information synopsis as a signature of the data, and sends both the encrypted information and the data to the receiver; and after receiving the data and the signature, the receiver first uses the same hash function as the sender uses to calculate the received data to obtain an information synopsis, and then decrypts the encrypted information synopsis by using a public key corresponding to the sender, and when the two information synopses are the same, the receiver may determine that the received data and signature are sent by the sender. The signature is used for preventing data from being tempered. It may be verified, by using a public key corresponding to a private key, whether the data is data sent by a sender having the private key.

Referring to FIG. 1A, FIG. 1A is a schematic structural diagram of a wireless network connection system according to an exemplary embodiment of this application. The wireless network connection system includes: a radio access point 120, a user terminal 140, and an authentication server 160.

The radio access point 120 may be a general term for devices providing a wireless network access service such as a router, a Wi-Fi hotspot, and a wireless gateway. In this embodiment of this application, the radio access point 120 is described by using a router as an example. Before the radio access point 120 establishes a wireless network connection to the user terminal 140, the authentication server 160 needs to perform identity authentication on the radio access point 120. The radio access point 120 establishes a connection to the authentication server 160 by using a wireless network or a wired network. A manner of communication between the radio access point 120 and the authentication server 160 is not limited in this embodiment of this application.

The user terminal 140 may be a mobile phone, a tablet computer, an e-book reader, a moving picture experts group audio layer III (MP3) player, a moving picture experts group audio layer IV (MP4) player, a portable laptop computer, a desktop computer, or the like. In some examples, an application program having a barcode scanning function, for example, Tencent QQ, WeChat, QQ Browser, or a wireless Internet access program, is installed in the user terminal 140.

The user terminal 140 establishes a connection to the authentication server 160 by using a wireless network or a wired network. In some examples, the user terminal 140 registers user information and key information with the authentication server 160 through an independent channel. The user information is information used for identifying a user, such as a user name, a user ID, a device identifier (for example, an international mobile equipment identity (IMEI), a unique device identifier (UDID), or a Media Access Control (MAC) address) of the user, or an IP address of the user. The independent channel is a communication channel bypassing the radio access point, for example, a 2G network, or a 3G network. A manner of communication between the user terminal 140 and the authentication server 160 is not limited in this embodiment of this application.

The authentication server 160 stores a set of trusted public keys, and user information and key information that correspond to each user terminal 140. The authentication server 160 may be one server, a server cluster including multiple servers, or a cloud computing center.

Figure 1B:
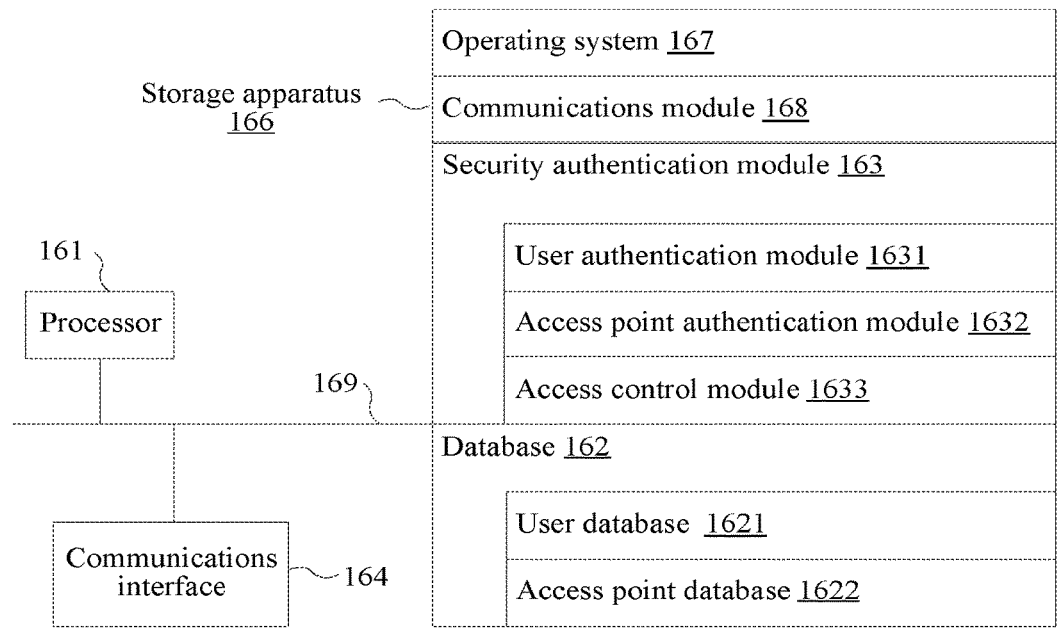
FIG. 1B is a schematic diagram of an authentication server according to an embodiment of this application.

FIG. 1B is a schematic diagram of an authentication server according to an embodiment of this application. The authentication server may include a processor 161, a communications interface 164, a storage apparatus 166, and an interconnect mechanism 169. The storage apparatus 166 includes an operating system 167, a communications module 168, a database 162, and a security authentication module 163.

There may be one or more processors 161, which may exist in a same physical device, or may be distributed in multiple physical devices.

The authentication server may communicate with a user terminal and radio access point device through the communications interface 164 by using a network.

The database 162 stores a user database 1621 and an access node database 1622. The user database 1621 stores user information and key information that correspond to each user terminal 140. The access node database 1622 stores a set of trusted public keys, that is, a set of public keys corresponding to an authenticated radio access point.

The security authentication module 163 includes a user authentication module 1631, an access point authentication module 1632, and an access control module 1633.

The user authentication module 1631 may receive a registration request sent by the user terminal, generate the user information and the key information for the user terminal, provides the generated user information and key information for the user terminal, and stores the generated user information and key information in the user database 1621.

The access point authentication module 1632 may receive an identity authentication request sent by the radio access point, and add a public key corresponding to a radio access point on which identity authentication has been performed to the set of trusted public keys in the access node database 1622. In some examples, the access point authentication module 1632 may perform identity authentication on the radio access point according to authentication information of a service provider that is received from another device. The another device refers to another device used by a party (for example, a merchant) that accesses a service by using a public wireless network provided by the radio access point, and is also referred to as a merchant terminal below. The authentication information provided by the merchant terminal is information related to an identity and qualification of an owner of the radio access point. For example, the information may include owner information, administrator information, a qualification certificate of the merchant, or business license information.

After receiving an access request of the radio access point, the access control module 1633 may verify whether the radio access point is a trusted radio access point by using the set of trusted public keys in the access node database 1622; and when the radio access point is a trusted radio access point, generate a communication key for the user terminal according to user information in the access request and user data in the user database 1621, and separately send the communication key to the user terminal and the radio access point. The communication key herein is a key specially used for encrypted communication between the user terminal and the radio access point, and is also referred to as a master key below.

In this embodiment of this application, the master key used by the user terminal to perform encrypted communication with the radio access point is different from a key (that is, the key information corresponding to the user information of the user terminal in the user database 1621) used by the authentication server to perform authentication on the user terminal, and is different from a key (that is, the public key and a private key that correspond to the radio access point) used by the radio access point to communicate with the authentication server.

In some embodiments, when the authentication server may be implemented by multiple servers, the foregoing modules may separately exist in different physical devices, and functions of a same module may be implemented by multiple physical devices. The module division manner of the modules in the security authentication module 163 is used merely for ease of description. In other embodiments, the function of the security authentication module 163 may be implemented by a module set obtained according to multiple division manners.

Figure 1C:
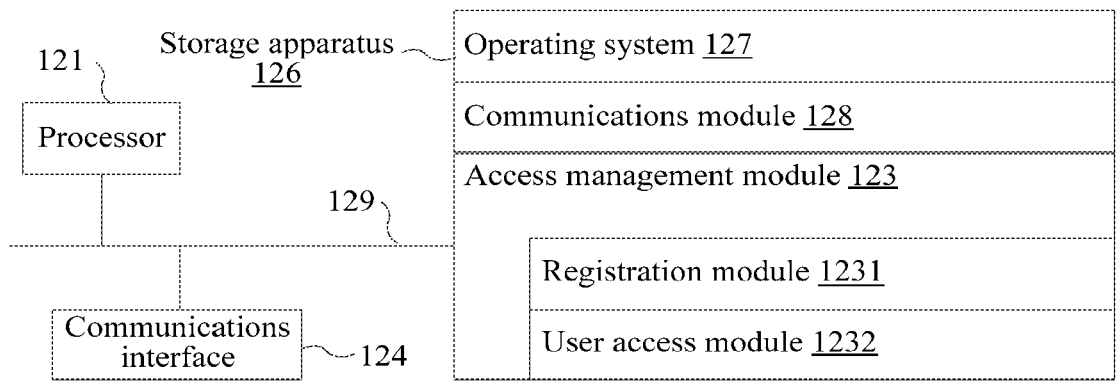
FIG. 1C is a schematic diagram of a radio access point according to an embodiment of this application.

FIG. 1C is a schematic diagram of a radio access point according to an embodiment of this application. The radio access point may include a processor 121, a communications interface 124, a storage apparatus 126, and an interconnect mechanism 129. The storage apparatus 126 includes an operating system 127, a communications module 128, and an access management module 123.

There may be one or more processors 121, and the processor 121 may include a multi-core processor.

The storage apparatus 126 may include one or more of a ROM, a FLASH, a NVRAM, and a RAM.

The radio access point may communicate with a user terminal and an authentication server through the communications interface 124.

The access management module 123 includes a registration module 1231 and a user access module 1232.

The registration module 1231 may obtain a public key and a private key that correspond to the radio access point according to a preset mechanism, obtain preset information (for example, an address, or a public key corresponding to the authentication server) of the authentication server, and send an identity authentication request to the authentication server.

After receiving a first access request sent by the user terminal, the user access module 1232 sends a second access request including information about the user terminal to the authentication server, receives a master key sent by the authentication server, and establishes an encrypted wireless network connection to the user terminal by using the master key.

In some embodiments, the access management module 123 may be stored in the ROM, the FLASH, or the NVRAM as firmware. Various preset mechanisms and information may be used as one part of the access management module 123 and stored in the ROM, the FLASH, or the NVRAM, or may be stored in the ROM, the FLASH, or the NVRAM in a form of an independent configuration file.

Figure 2:
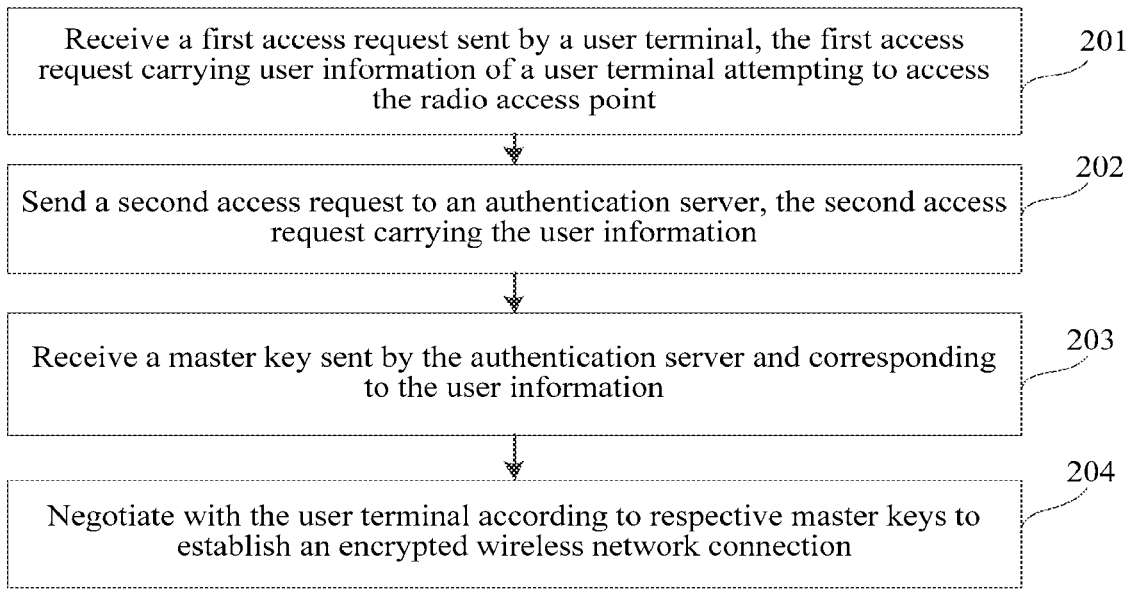
FIG. 2 is a flowchart of a wireless network connection method according to an embodiment of this application.

Referring to FIG. 2, FIG. 2 is a flowchart of a wireless network connection method according to an embodiment of this application. This embodiment is described by using an example in which the wireless network connection method is applied to the radio access point 120 shown in FIG. 1A. The method includes the following steps.

Step 201. Receive a first access request sent by a user terminal, the first access request carrying user information of a user terminal attempting to access the radio access point.

Step 202. Send a second access request to an authentication server, the second access request carrying the user information.

Step 203. Receive a master key sent by the authentication server and corresponding to the user information, the master key being a key that is generated through negotiation by the authentication server after receiving the second access request, when verifying that the radio access point is a trusted radio access point, and after successfully performing a first identity authentication on the user terminal.

Step 204. Negotiate with the user terminal according to respective master keys to establish an encrypted wireless network connection.

In conclusion, in the wireless network access method provided in this embodiment, a first access request sent by a user terminal is received; a second access request is sent to an authentication server; a master key sent by the authentication server and corresponding to user information is received; and an encrypted wireless network connection is established through negotiation with the user terminal according to the master key. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the master key, thereby improving security of both the data transmitted by the user terminal and the data within the user terminal.

Figure 3:
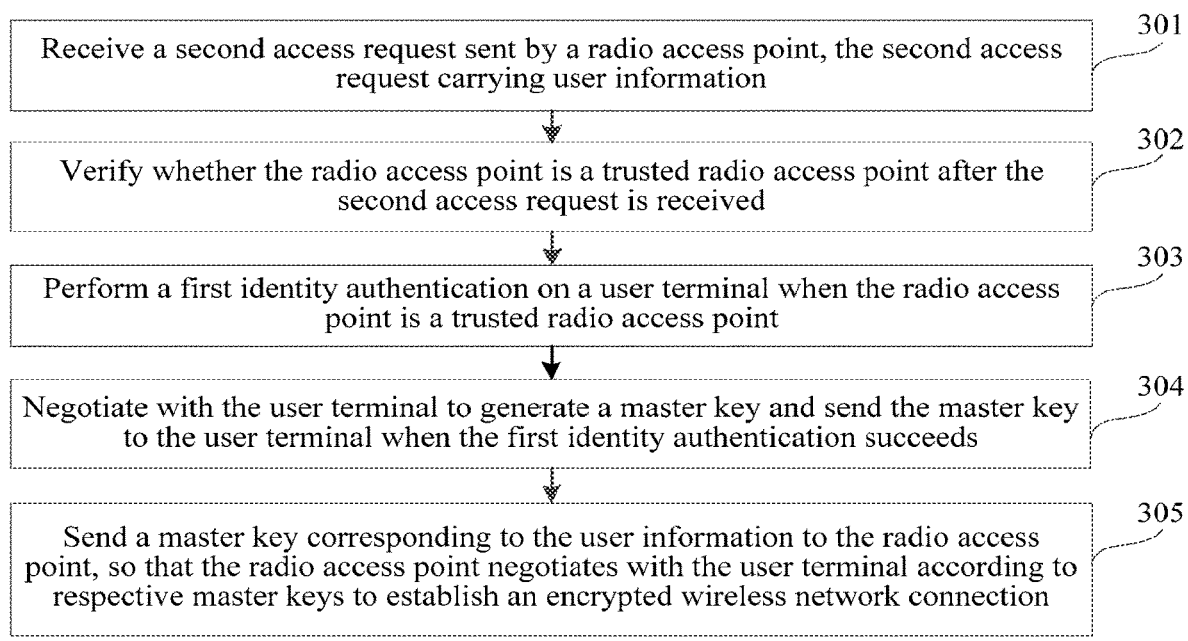
FIG. 3 is a flowchart of a wireless network connection method according to an embodiment of this application.

Referring to FIG. 3, FIG. 3 is a flowchart of a wireless network connection method according to an embodiment of this application. This embodiment is described by using an example in which the wireless network connection method is applied to the authentication server 160 shown in FIG. 1A. The method includes the following steps.

Step 301. Receive a second access request sent by a radio access point, the second access request carrying user information.

Step 302. Verify whether the radio access point is a trusted radio access point after the second access request is received.

Step 303. Perform a first identity authentication on a user terminal when the radio access point is a trusted radio access point.

Step 304. Negotiate with the user terminal to generate a master key and send the master key to the user terminal when the first identity authentication succeeds.

Step 305. Send a master key corresponding to the user information to the radio access point, so that the radio access point negotiates with the user terminal according to respective master keys to establish an encrypted wireless network connection.

In conclusion, in the wireless network connection method provided in this embodiment, a second access request sent by a radio access point is received; it is verified whether the radio access point is a trusted radio access point after the second access request is received; a first identity authentication is performed with a user terminal when the radio access point is a trusted radio access point; a master key is generated through negotiation with the user terminal when the first identity authentication succeeds, and the master key is sent to the user terminal; and the master key corresponding to user information is sent to the radio access point. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the master key, thereby improving security of both the data transmitted by the user terminal and the data within the user terminal.

Figure 4:
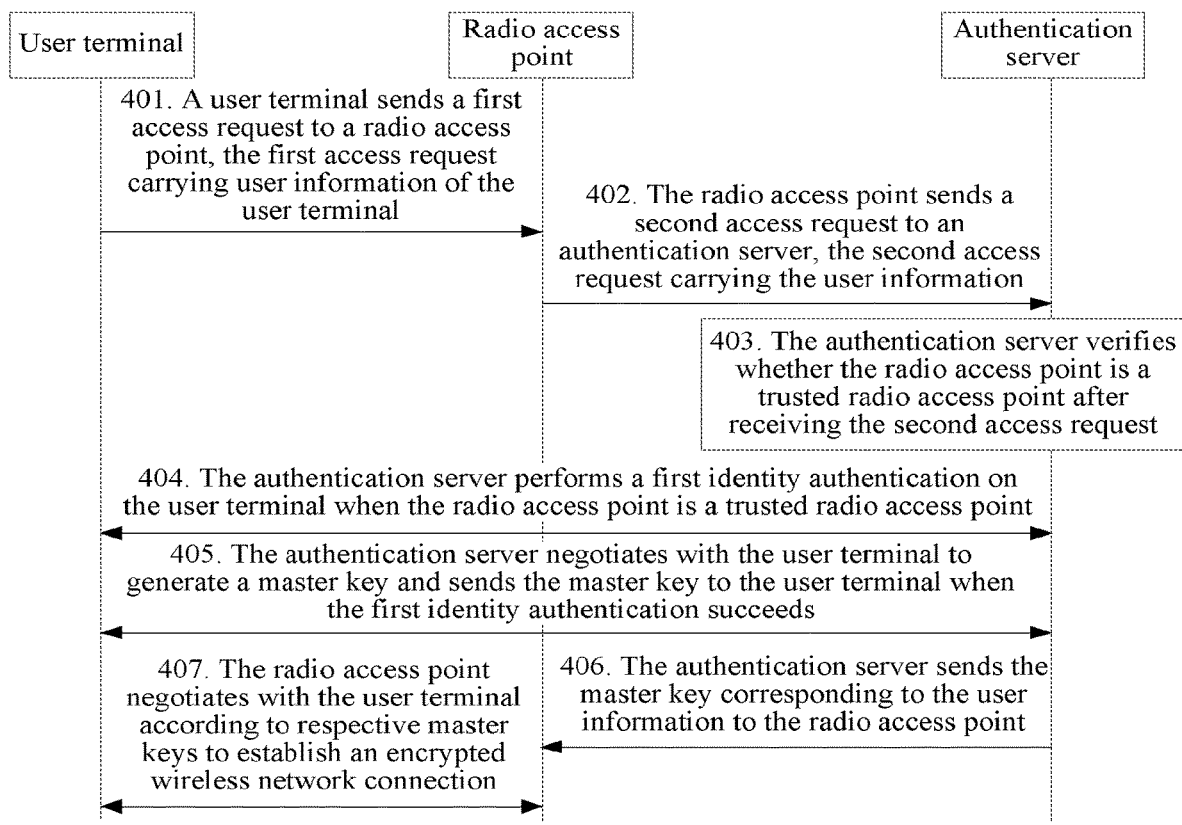
FIG. 4 is a flowchart of a wireless network connection method according to an embodiment of this application.

Referring to FIG. 4, FIG. 4 is a flowchart of a wireless network connection method according to an embodiment of this application. This embodiment is described by using an example in which the wireless network connection method is applied to the wireless network access system shown in FIG. 1A. The method includes the following steps.

Step 401. A user terminal sends a first access request to a radio access point, the first access request carrying user information of the user terminal.

The user terminal stores the user information and the key information that are registered in advance with an authentication server.

Correspondingly, the radio access point receives the first access request sent by the user terminal.

Step 402. The radio access point sends a second access request to an authentication server, the second access request carrying the user information.

The second access request carries a second public key corresponding to the radio access point.

Correspondingly, the authentication server receives the second access request sent by the radio access point.

Step 403. The authentication server verifies whether the radio access point is a trusted radio access point after receiving the second access request.

Step 404. The authentication server performs a first identity authentication on the user terminal when the radio access point is a trusted radio access point.

When the radio access point is a trusted radio access point, the authentication server and the user terminal performs mutual identity authentication. That is, the authentication server performs identity authentication on the user terminal, to authenticate whether the user terminal is trusted; at the same time, the user terminal also performs authentication on the authentication server.

Step 405. The authentication server negotiates with the user terminal to generate a master key and sends the master key to the user terminal when the first identity authentication succeeds.

Correspondingly, the user terminal receives the master key sent by the authentication server and corresponding to the user information.

Step 406. The authentication server sends the master key corresponding to the user information to the radio access point.

Correspondingly, the radio access point receives the master key sent by the authentication server and corresponding to the user information.

Step 407. The radio access point negotiates with the user terminal according to respective master keys to establish an encrypted wireless network connection.

In conclusion, in the wireless network access method provided in this embodiment, a user terminal sends a first access request to a radio access point; the radio access point sends a second access request to an authentication server; the authentication server verifies whether the radio access point is a trusted radio access point after receiving the second access request, and performs a first identity authentication on the user terminal when the radio access point is a trusted radio access point; the authentication server negotiates with the user terminal to generate a master key when the first identity authentication succeeds, and sends the master key to the user terminal; the authentication server sends the master key corresponding to user information to the radio access point; and the radio access point negotiates with the user terminal according to respective master keys to establish an encrypted wireless network connection. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the master key, thereby improving security of both the data transmitted by the user terminal and the data within the user terminal.

In a specific example, the entire process of this embodiment of this application includes four phases.

In the first phase, the radio access point completes identity authentication in the authentication server according to the second public key and a second private key that correspond to the radio access point. The authentication server adds the second public key corresponding to the radio access point on which the identity authentication has been performed to a set of trusted public keys.

In the second phase, the user terminal registers the user information and the key information with the authentication server through an independent channel. The authentication server feeds back the user information and the key information that are registered with the user terminal to the user terminal. In some examples, the key information is a password or a certificate.

In the third phase, the user terminal sends the first access request to the radio access point, the first access request carrying the user information. The radio access point sends the second access request to the authentication server, the second access request carrying the user information and the second public key corresponding to the radio access point.

In the fourth phase, the authentication server verifies the radio access point, and performs the first identity authentication on the user terminal when the radio access point is a trusted radio access point; and negotiates with the user terminal according to respective key information to generate the master key and separately sends the master key corresponding to the user information to the user terminal and the radio access point when the first identity authentication succeeds. The radio access point negotiates with the user terminal according to respective master keys to establish the encrypted wireless network connection.

Figure 5A:
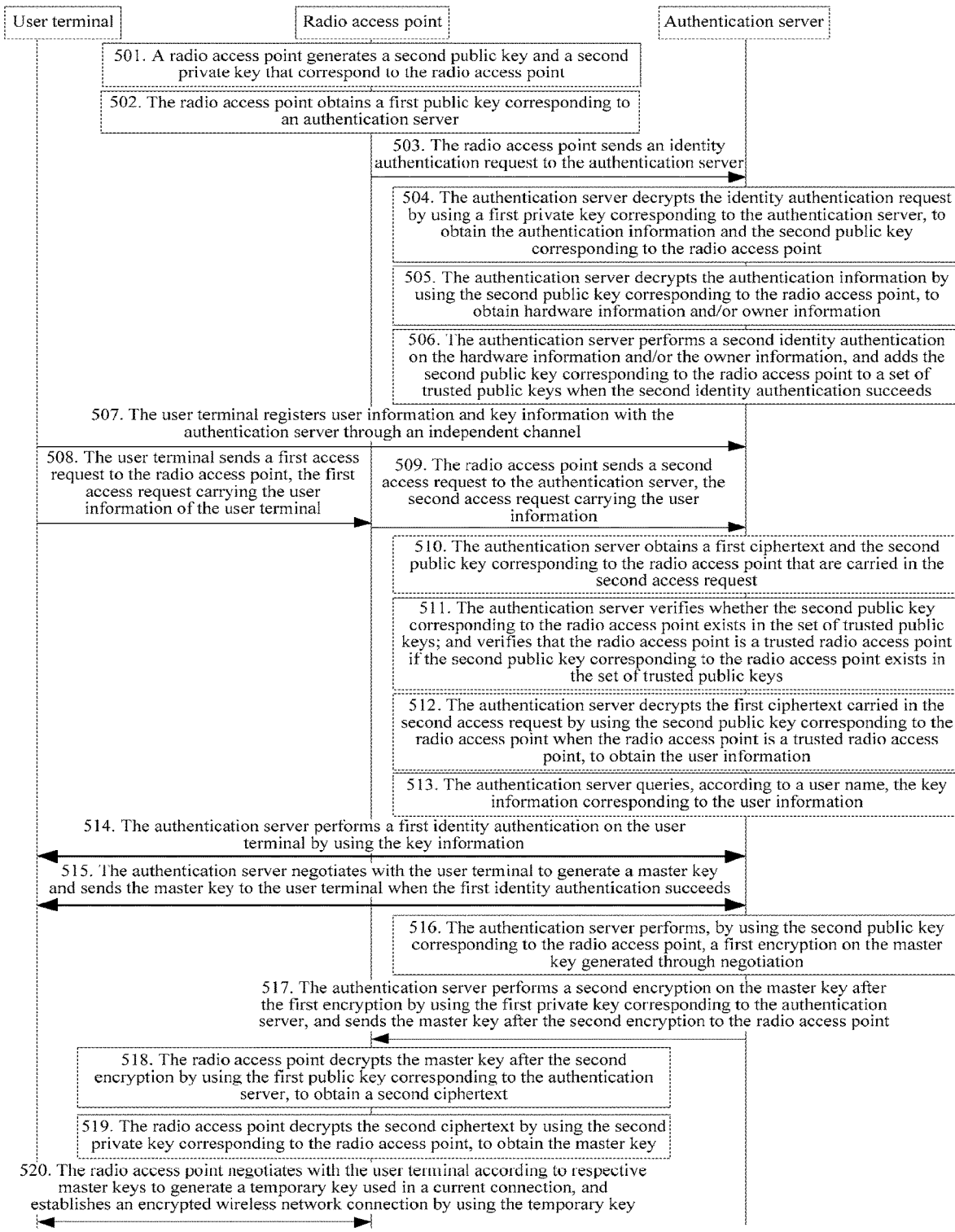
FIG. 5A is a flowchart of a wireless network access method according to an embodiment of this application.

Referring to FIG. 5A, FIG. 5A is a flowchart of a wireless network connection method according to another embodiment of this application. This embodiment is described by using an example in which the wireless network access method is applied to the wireless network access system shown in FIG. 1A. The method includes the following steps.

The first phase includes step 501 to step 506.

Step 501. A radio access point generates a second public key and a second private key that correspond to the radio access point.

The radio access point first generates the second public key and the second private key that correspond to the radio access point before using them. The second private key is stored in the radio access point.

Step 502. The radio access point obtains a first public key corresponding to an authentication server.

After generating the second public key and the second private key, the radio access point obtains the first public key corresponding to the authentication server.

In some examples, the radio access point first obtains the first public key corresponding to the authentication server, and then generates the second public key and the second private key that correspond to the radio access point.

In some examples, the first public key corresponding to the authentication server is stored in firmware of the radio access point. The radio access point directly obtains the first public key corresponding to the authentication server from the firmware.

In this embodiment, a sequential order of obtaining, by the radio access point, the first public key corresponding to the authentication server and generating the second public key and the second private key that correspond to the radio access point is not specifically limited.

Step 503. The radio access point sends an identity authentication request to the authentication server.

The identity authentication request carries authentication information and a second public key corresponding to the radio access point, both the authentication information and the second public key corresponding to the radio access point are encrypted by using the first public key corresponding to the authentication server, and the authentication information includes at least hardware information and/or owner information.

In some examples, the authentication information is information that is obtained after the radio access point performs an encryption by using the second private key corresponding to the radio access point.

In some examples, the radio access point directly sends the hardware information and the owner information to the authentication server. In some other examples, the radio access point sends the hardware information to the authentication server, and a management terminal indirectly sends the owner information to the authentication server.

In this embodiment, a manner of sending the authentication information to the authentication server is not specifically limited. In this embodiment, an example in which the radio access point sends the hardware information and the owner information to the authentication server is used for description.

After obtaining the first public key corresponding to the authentication server, the radio access point establishes an encrypted channel to the authentication server. The radio access point adds the authentication information and the second public key corresponding to the radio access point to the identity authentication request and sends the identity authentication request to the authentication server through the encrypted channel.

The encrypted channel means that all information sent by the radio access point to the authentication server is encrypted by using the first public key corresponding to the authentication server, and after receiving the encrypted information sent by the radio access point, the authentication server needs to perform decryption by using a first private key of the authentication server to obtain the information thereof; and all information sent by the authentication server to the radio access point is encrypted by using the second public key corresponding to the radio access point, and after receiving the encrypted information sent by the authentication server, the radio access point needs to decrypt the information by using the second private key corresponding to the radio access point to obtain the information thereof.

In some examples, the hardware information corresponding to the radio access point may include: an SSID of the radio access point, a basic service set identifier (BSSID) of the radio access point, a MAC address of the radio access point, a network address of the radio access point, gateway Internet Protocol (IP) of the radio access point, or the like.

In this embodiment, a manner of providing, by the radio access point, the second public key for the authentication server is not specifically limited.

The owner information corresponding to the radio access point may include information such as an administrator account number, a merchant name, a registered company, a merchant address, and a merchant telephone.

In some examples, the radio access point may separately send the authentication information and the second public key corresponding to the radio access point to the authentication server. For example, the radio access point first encrypts the second public key corresponding to the radio access point by using the first public key corresponding to the authentication server and sends the encrypted second public key to the authentication server, and then encrypts the authentication information by using the second public key corresponding to the radio access point and then sends the encrypted authentication information to the authentication server. The authentication server first performs decryption according to the first private key corresponding to the authentication server to obtain the second public key corresponding to the radio access point, and then decrypts the encrypted authentication information by using the second public key corresponding to the radio access point to obtain the authentication information.

In some examples, the radio access point may directly send the identity authentication request to the authentication server, the identity authentication request carrying the second public key corresponding to the radio access point, the hardware information and/or the owner information.

In some examples, the radio access point encrypts the identity authentication request by using the first public key corresponding to the authentication server, the identity authentication request carrying the second public key corresponding to the radio access point, the hardware information and/or the owner information.

In some examples, the radio access point encrypts the identity authentication request by using the first public key corresponding to the authentication server, the identity authentication request carrying the authentication information and the second public key corresponding to the radio access point. The authentication information is information that is obtained after the radio access point performs an encryption by using the second private key corresponding to the radio access point. The authentication information carries the hardware information and/or the owner information.

Correspondingly, the authentication server receives the identity authentication request sent by the radio access point.

In this embodiment, an example in which the radio access point encrypts the identity authentication request by using the first public key corresponding to the authentication server, the identity authentication request including the authentication information and the second public key corresponding to the radio access point; and encrypts the authentication information by using the second private key corresponding to the radio access point is used for description.

Step 504. The authentication server decrypts the identity authentication request by using a first private key corresponding to the authentication server, to obtain the authentication information and the second public key corresponding to the radio access point.

After receiving the identity authentication request sent by the radio access point, the authentication server decrypts the identity authentication request by using the first private key corresponding to the authentication server, to obtain the authentication information and the second public key corresponding to the radio access point that are carried in the identity authentication request.

Step 505. The authentication server decrypts the authentication information by using the second public key corresponding to the radio access point, to obtain hardware information and/or owner information.

The authentication server performs decryption by using the first private key corresponding to the authentication server to obtain the authentication information and the second public key corresponding to the radio access point, and subsequently, decrypts the authentication information by using the second public key corresponding to the radio access point, to obtain the hardware information and/or the owner information that are included in the authentication information.

Step 506. The authentication server performs a second identity authentication on the hardware information and/or the owner information, and adds the second public key corresponding to the radio access point to a set of trusted public keys when the second identity authentication succeeds.

After performing decryption to obtain the hardware information and/or the owner information carried in the authentication information, the authentication server performs the second identity authentication on the hardware information and/or the owner information. In some examples, the second identity authentication process is a manual review process.

The second identity authentication is to check whether the hardware information and/or the owner information carried in the authentication information is correct or complete. After the second identity authentication succeeds, the authentication server adds the second public key corresponding to the radio access point to the set of trusted public keys, and stores the second public key corresponding to the radio access point. The set of trusted public keys is a list of second public keys corresponding to a radio access point on which the second identity authentication has been successfully performed that is stored in the authentication server. That is, the corresponding radio access points in the set of trusted public keys are all radio access points on which the second identity authentication has been successfully performed by the authentication server.

In some examples, after the second identity authentication succeeds, the authentication server adds a correspondence between the second public key corresponding to the radio access point and the radio access point to the set of trusted public keys, allows a user terminal to query the radio access point from the authentication server, and authenticates whether the radio access point is a trusted radio access point. In addition, the authentication server allows the radio access point to query a master key corresponding to user information of the user terminal from the authentication server.

Exemplarily, the set of trusted public keys is shown in the following Table 1:

TABLE 1

| Radio access point | Second public key |
| --- | --- |
| Access point A | Public key 1 |
| Access point B | Public key 2 |
| Access point C | Public key 3 |
| Access point D | Public key 4 |

As shown in Table 1, a second public key corresponding to the radio access point A is "a public key 1"; a second public key corresponding to the radio access point B is "a public key 2"; a second public key corresponding to the radio access point C is "a public key 3"; and a second public key corresponding to the radio access point D is "a public key 4".

Figure 5B:
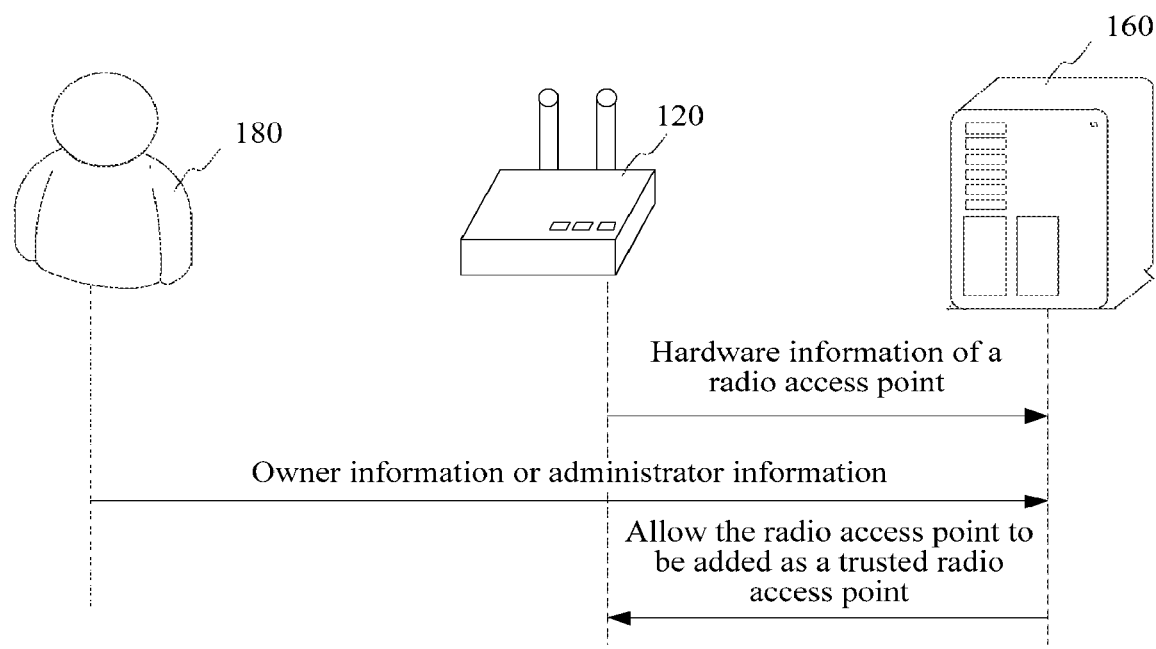
FIG. 5B is a schematic diagram of a process in which an authentication server performs identity authentication on a radio access point according to an embodiment of this application.

The process of performing the second identity authentication on the radio access point by the authentication server is shown in FIG. 5B. In FIG. 5B, the radio access point 120 sends the hardware information to the authentication server 160. A merchant terminal 180 registering the radio access point 120 sends the owner information and administrator information to the authentication server 160. The authentication server 160 performs identity authentication on the received hardware information, owner information, and administrator information, and after the second identity authentication succeeds, allows the radio access point 120 to join the trusted radio access point.

The second phase includes step 507.

Step 507. The user terminal registers user information and key information corresponding to the user information with the authentication server through an independent channel.

The independent channel is a communication channel bypassing the radio access point.

In some examples, the key information includes at least one of a password or a certificate.

When the authentication server generates the user information and the key information that correspond to the user terminal, the authentication server stores a correspondence between the user terminal and the user information and the key information in the authentication server, and sends the user information and the key information to the user terminal.

In some examples, the authentication server stores the user information and the key information that are registered by the user terminal in a form of a user information-password pair, or the authentication server stores the user information and the key information that are registered by the user terminal in a form of a user information-certificate pair.

Exemplarily, a correspondence used by the authentication server to perform storage in the form of a user information-password pair is shown in the following Table 2:

TABLE 2

| User information | Password |
| --- | --- |
| User A | Password 1 |
| User B | Password 2 |
| User C | Password 3 |

In some examples, the user information and the key information that are registered by the user terminal with the authentication server are unique. That is, each user terminal corresponds to a unique piece of user information and key information, and the user terminal is in a one-to-one corresponding with the user information.

Figure 5C:
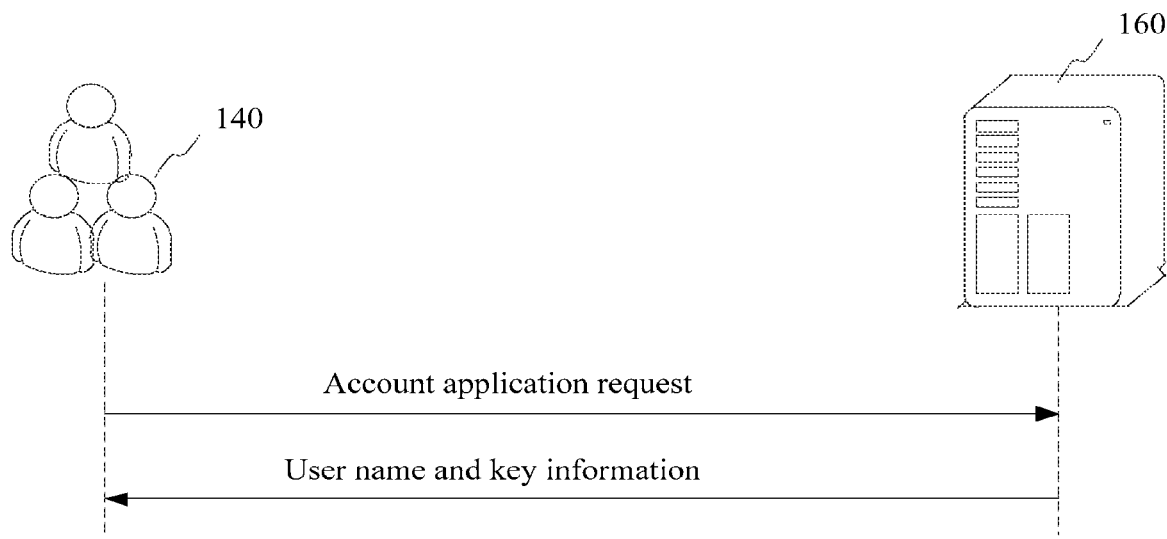
FIG. 5C is a schematic diagram of a process in which a user terminal registers a user name and key information with an authentication server according to an embodiment of this application.

A process in which the user terminal registers the user information and the key information with the authentication server is shown in FIG. 5C, and is described by using an example in which the user terminal registers the user information and the password with the authentication server. In FIG. 5C, the user terminal 140 completes registration of the user information and the password with the authentication server 160 through the independent channel. That is, a registration process of the user information and the password is completed through a communication channel bypassing the radio access point.

In some examples, the user terminal may register the user information and the key information with the authentication server by using a communication-type client, a browser client, or the like in the user terminal.

The third phase includes step 508 and step 509.

Step 508. The user terminal sends a first access request to the radio access point, the first access request carrying the user information of the user terminal.

The user terminal stores the user information and the key information that are registered in advance with the authentication server.

When there is a radio access point to be accessed, the user terminal sends a first access request to the radio access point, the first access request carrying the user information corresponding to the user terminal.

The user terminal sends the first access request to the radio access point in the following manners.

In some examples, the user terminal scans, by using a barcode scanning function in an application program, a two-dimensional code carrying the hardware information of the radio access point and provided by a merchant. In this case, the user terminal sends the first access request to the radio access point by scanning a two-dimensional code.

In some examples, the user terminal sends the first access request to the radio access point according to an official account carrying the hardware information of the radio access point and provided by a merchant.

In some examples, the user terminal sends the first access request to the radio access point according to an independent wireless network client carrying the hardware information of the radio access point and provided by a merchant.

For example, the user terminal scans, by using a function of "scan QR code" on WeChat, a two-dimensional barcode carrying the hardware information of the radio access point and provided by a merchant, and sends the first access request to the radio access point by using WeChat. For another example, the user terminal directly scans, by using a function of "scan QR code" on a browser, a two-dimensional barcode carrying the hardware information of the radio access point and provided by a merchant, and directly sends the first access request to the radio access point by using the browser.

For another example, the user terminal follows, by using a function of "follow" on WeChat, an official account provided by a merchant, and sends the first access request to the radio access point by using the official account. For still another example, the user terminal installs an independent wireless network client carrying the hardware information of the radio access point and provided by a merchant, and sends the first access request to the radio access point by using the independent wireless network client.

Correspondingly, the radio access point receives the first access request sent by the user terminal.

Step 509. The radio access point sends a second access request to the authentication server, the second access request carrying the user information.

After receiving the first access request sent by the user terminal, the radio access point sends the second access request to the authentication server, the second access request carrying the user information.

In some examples, the second access request further carries the second public key corresponding to the radio access point.

After receiving the first access request sent by the user terminal, the radio access point sends the second public key corresponding to the radio access point and the user information carried in the first access request to the authentication server.

In some examples, the radio access point sends the second access request to the authentication server, the second access request carrying the user information and the second public key corresponding to the radio access point.

In some examples, the radio access point sends the second access request to the authentication server, the second access request carrying the user information and the second public key corresponding to the radio access point. The second access request is a request of the radio access point for performing encryption by using the first public key corresponding to the authentication server.

In some examples, the radio access point sends the second access request to the authentication server, the second access request carrying a first ciphertext and the second public key corresponding to the radio access point. The second access request is a request of the radio access point for performing encryption by using the first public key corresponding to the authentication server. The first ciphertext is a ciphertext that is obtained after the radio access point encrypts the user information by using the second private key corresponding to the radio access point.

This embodiment is described by using a third possible implementation as an example.

Correspondingly, the authentication server receives the second access request sent by the radio access point.

The fourth phase includes step 510 to step 519.

Step 510. The authentication server obtains a first ciphertext and the second public key corresponding to the radio access point that are carried in the second access request.

After receiving the second access request sent by the radio access point, the authentication server obtains the first ciphertext and the second public key corresponding to the radio access point that are carried in the second access request.

In some examples, after receiving the second access request, the authentication server may directly obtain the user information and the second public key corresponding to the radio access point that are carried in the second access request.

In some examples, after receiving the second access request, the authentication server may decrypt the second access request by using the first private key corresponding to the authentication server, to obtain the user information and the second public key corresponding to the radio access point that are carried in the second access request.

The second access request is a request of the radio access point for encrypting the first ciphertext and the second public key corresponding to the radio access point by using the first public key corresponding to the authentication server.

Step 511. The authentication server verifies whether the second public key corresponding to the radio access point exists in the set of trusted public keys; and verifies that the radio access point is a trusted radio access point if the second public key corresponding to the radio access point exists in the set of trusted public keys.

The set of trusted public keys stores a second public keys corresponding to a radio access point on which the identity authentication has been successfully performed by the authentication server, and the first ciphertext includes the user information.

After obtaining the second public key corresponding to the radio access point, the authentication server verifies whether the second public key corresponding to the radio access point exists in the set of trusted public keys. The authentication server verifies that the radio access point is a trusted radio access point if the second public key corresponding to the radio access point exists in the set of trusted public keys.

For example, using the exemplary set of trusted public keys shown in Table 1 as an example, assuming that the second public key corresponding to the radio access point obtained by the authentication server is the public key 2, the public key 2 obtained by the authentication server is matched against a second public key corresponding to the radio access point in the set of trusted public keys shown in Table 1, and then it is found that the public key 2 belongs to the set of trusted public keys. In this case, the authentication server determines that the radio access point is a trusted radio access point.

In some examples, when the authentication server verifies that the radio access point is not a trusted radio access point, the authentication server does not perform any subsequent step.

Step 512. The authentication server decrypts the first ciphertext carried in the second access request by using the second public key corresponding to the radio access point when the radio access point is a trusted radio access point, to obtain the user information.

After determining that the radio access point is a trusted radio access point, the authentication server decrypts the obtained first ciphertext by using the obtained second public key corresponding to the radio access point, to obtain the user information carried in the first ciphertext.

The first ciphertext is a ciphertext that is obtained after the radio access point encrypts the user information by using the second private key corresponding to the radio access point.

Step 513. The authentication server queries, according to the user information (e.g., user name), the key information corresponding to the user information.

After decrypting the first ciphertext to obtain the user information carried in the first ciphertext, the authentication server queries the key information corresponding to the user information.

For example, using the exemplary correspondence between user information and a password as an example, assuming that the user information obtained by the authentication server and carried in the second access request is the "user B", the authentication server queries the correspondence between user information and a password for a password corresponding to the "user B". In this case, as shown in Table 2, the found password is the "password 2".

Step 514. The authentication server performs a first identity authentication on the user terminal by using the key information.

After finding the key information corresponding to the user information, the authentication server performs the first identity authentication on the user terminal by using the key information. In some examples, the first identity authentication refers to mutual authentication between the authentication server and the user terminal. That is, the authentication server needs to perform identity authentication on the user terminal according to the key information; and the user terminal also needs to perform identity authentication on the authentication server according to the key information.

In some examples, the first identity authentication is a one-way authentication. That is, the authentication server performs identity authentication on the user terminal according to the key information; or the user terminal needs to perform identity authentication on the authentication server according to the key information.

In the process of performing, by the authentication server, the first identity authentication on the user terminal and negotiating with the user terminal to generate the master key, the authentication server establishes a Transport Layer Security (TLS) channel, and then by means of forwarding by the radio access point, performs the first identity authentication and negotiation to generate the master key.

In some examples, the process of performing, by the authentication server, the first identity authentication on the user terminal complies with the Protected Extensible Authentication Protocol (PEAP) for a user access protocol.

Step 515. The authentication server negotiates with the user terminal to generate a master key and sends the master key to the user terminal when the first identity authentication succeeds.

The authentication server negotiates with the user terminal according to the key information to generate a master key when the first identity authentication succeeds.

In some examples, the master key that is generated through negotiation between the authentication server and the user terminal is a pairwise master key (PMK).

After negotiating with the user terminal to generate the master key, the authentication server sends, through a TLS channel, the master key generated through negotiation to the user terminal.

Step 516. The authentication server performs, by using the second public key corresponding to the radio access point, a first encryption on the master key generated through negotiation.

There are three manners in which the authentication server sends the master key to the radio access point.

In some examples, the authentication server may directly send the master key to the radio access point through an encrypted channel.

In some examples, the authentication server may encrypt the master key by using the first private key corresponding to the authentication server, and send the encrypted master key to the radio access point.

In some examples, the authentication server may first perform the first encryption on the master key by using the second public key corresponding to the radio access point; then perform a second encryption on the master key after the first encryption by using the first private key corresponding to the authentication server; and send the master key after the second encryption to the radio access point. This embodiment is described by using this manner as an example.

The second public key corresponding to the radio access point is stored when the identity authentication performed by the authentication server on the radio access point succeeds.

After negotiating with the user terminal to generate the master key, the authentication server performs the first encryption on the master key by using the second public key corresponding to the radio access point.

Step 517. The authentication server performs a second encryption on the master key after the first encryption by using the first private key corresponding to the authentication server, and sends the master key after the second encryption to the radio access point.

After performing the first encryption on the master key by using the second public key corresponding to the radio access point, the authentication server then performs the second encryption on the master key after the first encryption by using the first private key corresponding to the authentication server. The authentication server sends the master key after the two encryptions to the radio access point.

In some examples, this embodiment is described merely by using an example in which the first encryption is first performed on the master key by using the second public key corresponding to the radio access point; and then the second encryption is performed on the master key after the first encryption by using the first private key corresponding to the authentication server. In this embodiment, an encryption sequence for the master key is not specifically limited. The first private key corresponding to the authentication server may be first used to perform the first encryption on the master key, and then the second public key corresponding to the radio access point is used to perform the second encryption on the master key after the first encryption. In this embodiment, a manner of encrypting the master key by the authentication server is not specifically limited.

Correspondingly, the radio access point receives the encrypted master key sent by the authentication server.

In some examples, the radio access point receives the master key after the first encryption sent by the authentication server, the master key after the first encryption being a master key that is obtained after the authentication server encrypts, when the radio access point is a trusted radio access point, the master key by using the second public key corresponding to the radio access point.

In some examples, the radio access point receives the master key after the second encryption sent by the authentication server, the master key after the second encryption being a master key that is obtained after the authentication server performs, when the radio access point is a trusted radio access point, the first encryption on the master key by using the second public key corresponding to the radio access point and then performs the second encryption on the master key after the first encryption by using the first private key corresponding to the authentication server.

Step 518. The radio access point decrypts the master key after the second encryption by using the first public key corresponding to the authentication server, to obtain a second ciphertext.

After receiving the encrypted master key sent by the authentication server, the radio access point decrypts the master key after the second encryption by using the first public key corresponding to the authentication server, to obtain the second ciphertext.

The second ciphertext is a ciphertext that is obtained after the authentication server encrypts the master key by using the second public key corresponding to the radio access point.

Step 519. The radio access point decrypts the second ciphertext by using the second private key corresponding to the radio access point, to obtain the master key.

After performing decryption by using the first public key corresponding to the authentication server to obtain the second ciphertext, the radio access point decrypts the second ciphertext by using the second private key corresponding to the radio access point, to obtain the master key.

In some examples, if the authentication server encrypts the master key corresponding to the user information by using the second public key corresponding to the radio access point, the radio access point can obtain the master key by using the second private key corresponding to the radio access point to decrypt the encrypted master key.

Step 520. The radio access point negotiates with the user terminal according to respective master keys to generate a temporary key used in a current connection, and establishes an encrypted wireless network connection by using the temporary key.

In some examples, the radio access point negotiates with the user terminal by using a PMK to generate a pairwise temporary key (PTK) used in the current connection, and the radio access point establishes the encrypted wireless network connection to the user terminal by using the PTK.

After the radio access point obtains the master key sent by the authentication server, the radio access point and the user terminal use the master keys respectively obtained by the radio access point and the user terminal as PMKs, to complete a Wi-Fi Protected Access II (WPA2) encryption protocol. The master keys are used as the PMKs, and the PTK used in the current connection is generated through negotiation. The user terminal and the radio access point use the PTK generated through negotiation to establish the encrypted wireless network connection.

A process in which the radio access point establishes the encrypted wireless network connection to the user terminal by using the PTK is specifically as follows:

First, the radio access point generates a random number A, and sends a message M1 to the user terminal, the message M1 carrying the random number A.

Second, the user terminal generates a random number B, and performs calculation according to the master key, the random number A, and the random number B, to obtain the PTK used in the current connection. The user terminal sends a message M2 to the radio access point, the message M2 carrying the random number B; and performs a message integrity code (MIC) authentication on the message M2 by using an acknowledgment key part in the PTK obtained through calculation.

Third, the radio access point obtains the random number B, performs calculation according to the master key, the random number A, and the random number B to obtain the PTK used in the current connection, and performs a MIC verification on the message M2 by using the acknowledgment key part in the PTK obtained through calculation. If the verification fails, the radio access point discards the message M2, or if the verification succeeds, the radio access point sends a message M3 to the user terminal, the message M3 including a MIC verification, so that the user terminal checks whether the radio access point has the master key.

Fourth, after receiving the message M3, the user terminal performs the MIC verification on the message M3, adds the message M3 to the PTK after the verification succeeds, and sends a message M4 to the radio access point, the message M4 being used for indicating that the user terminal has added the message M3 to the PTK. After receiving the message M4, the radio access point also adds the message M4 to the PTK. In this way, the process of establishing the encrypted wireless network connection is completed.

In this embodiment, a core encryption algorithm used for completing the WPA2 encryption protocol between the radio access point and the user terminal is described by using WPE2-PEAP as an example. However, the core encryption algorithm for completing the WPA2 encryption protocol may further include but is not limited to: Extensible Authentication Protocol-Transport Layer Security (EAP-TLS), EAP-TTLS/MSCHAPv2, PEAPv0/EAP-MSCHAPv2, PEAPv1/EAP-GTC, Protected Extensible Authentication Protocol-Transport Layer Security (PEAP-TLS), EPA-Subscriber Identity Module (EAP-SIM), EAP-Authentication and Key Agreement (EAP-AKA), and EAP-Flexible Authentication via Secure Tunneling (EAP-FAST).

Figure 5D:
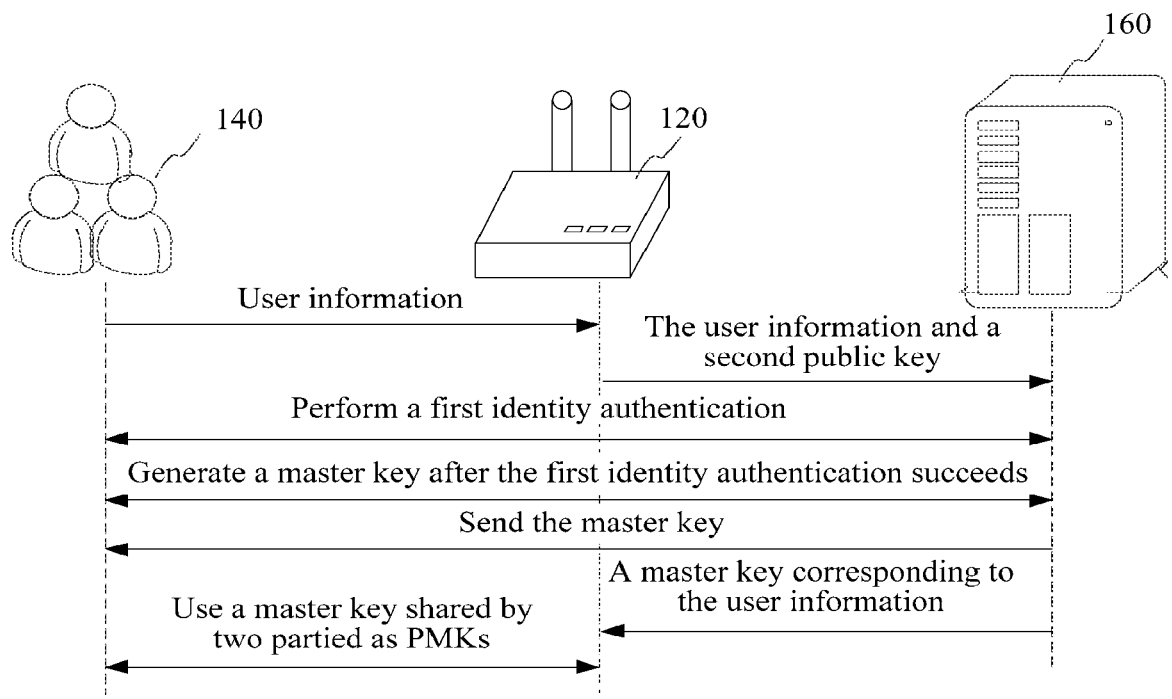
FIG. 5D is a schematic diagram of a process in which a user terminal accesses a radio access point according to an embodiment of this application.

In some examples, the process in which the user terminal accesses the radio access point is shown in FIG. 5D. The user terminal 140 sends the user information to the radio access point 120. The radio access point 120 forwards the user information to the authentication server 160. The authentication server 160 performs the first identity authentication on the user terminal 140 after determining that the radio access point is a trusted radio access point, and separately sends the master key corresponding to the user information to the user terminal 140 and the radio access point 120 after the first identity authentication succeeds. The user terminal 140 and the radio access point 120 negotiate, by using the obtained master keys as PMKs, to establish the encrypted wireless network connection.

In conclusion, in the wireless network access method provided in this embodiment, a user terminal sends a first access request to a radio access point; the radio access point sends a second access request to an authentication server; the authentication server verifies whether the radio access point is a trusted radio access point after receiving the second access request, performs a first identity authentication on the user terminal when the radio access point is a trusted radio access point, and negotiates with the user terminal to generate a master key when the first identity authentication succeeds; the authentication server sends the master key corresponding to user information to the radio access point; and the radio access point negotiates with the user terminal according to respective master keys to establish an encrypted wireless network connection. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the respective master keys, thereby improving security of both the data transmitted by the user terminal and the data within the user terminal.

In addition, the authentication server and the radio access point transmit data to each other through an encrypted channel, thereby improving data security during transmission.

It is noted that, in this embodiment, a sequential order of performing step 501 to step 506 and step 507 is not specifically limited. That is, there is no specific sequential order between the process of authenticating the radio access point by the authentication server and the process in which the user terminal registers the user information and the key information with the authentication server. However, the radio access point that establishes the encrypted wireless network connection to the user terminal needs to be a trusted radio access point stored in the authentication server.

It is further noted that, in this embodiment of this application, when the radio access point and the authentication server transmit data to each other through the encrypted channel, the transmitted data may further carry information such as a random number separately generated by the radio access point and the authentication server, or a time stamp for sending the data. For example, when the radio access point sends data to the authentication server, the data further carries information such as a random number generated by the radio access point, or a time stamp for sending the data. In this embodiment of this application, in the process in which the radio access point and the authentication server transmit data to each other, in addition to the information carried in the data in the foregoing embodiment, the data may further carry other information, which is not specifically limited. Similarly, when the user terminal and the authentication server transmit data to each other through the independent channel, the transmitted data may further carry information such as a random number separately generated by the user terminal and the authentication server, or a time stamp for sending the data. The details are not described herein again. All variant embodiments for information that may be further carried in the data are equivalent replacement embodiments of this embodiment of this application, and fall within the protection scope of this application.

In a specific embodiment, it is assumed that a hacker sets a fake radio access point, and the fake radio access point has completely the same hardware information as the radio access point does.

First, after obtaining a fake radio access point, the user terminal sends a first access request to the fake radio access point, the access request carrying the user information corresponding to the user terminal.

Second, the fake radio access point sends a second access request to the authentication server, the second access request carrying the user information.

The fake radio access point obtains the first public key corresponding to the authentication server, uses the first public key corresponding to the authentication server to encrypt the second access request, and sends the encrypted second access request to the authentication server.

Third, the authentication server decrypts the second access request by using a first private key corresponding to the authentication server, to obtain the second public key corresponding to the fake radio access point and the user information.

Fourth, the authentication server verifies whether the second public key corresponding to the fake radio access point exists in the set of trusted public keys.

Although the fake radio access point has completely the same hardware information as the radio access point does, the second public key corresponding to the radio access point is different from the second public key corresponding to the radio access point. Therefore, the authentication server determines that the fake radio access point is an untrusted radio access point when verifying whether the second public key corresponding to the fake radio access point exists in the set of trusted public keys. After determining that the radio access point is a fake radio access point, the authentication server does not send the master key corresponding to the user information to the fake radio access point.

In conclusion, if a hacker sets a fake radio access point, the fake radio access point has completely the same hardware information as the radio access point does. In the wireless network access method provided in the embodiment shown in FIG. 5A, the fake radio access point cannot establish an encrypted wireless network connection to the user terminal. In step 511, the second public key corresponding to the fake radio access point does not exist in the set of trusted public keys stored in the authentication server. Therefore, the fake radio access point is determined by the authentication server as an untrusted radio access point. Therefore, the wireless network access method provided in the embodiment in FIG. 5A improves security of both data transmitted by the user terminal and data within the user terminal.

Figure 6:
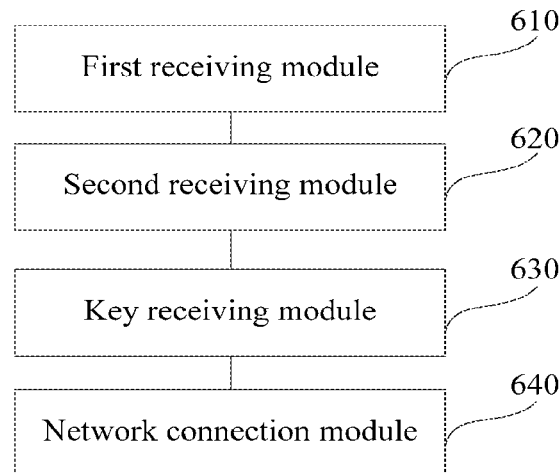
FIG. 6 is a structural block diagram of a wireless network connection apparatus according to an embodiment of this application.

Referring to FIG. 6, FIG. 6 is a structural block diagram of a wireless network connection apparatus according to an embodiment of this application. The wireless network connection apparatus may be implemented to be all or a part of the radio access point in FIG. 1A by using software, hardware, or a combination thereof. The wireless network connection apparatus includes:

a first receiving module 610, configured to receive a first access request sent by a user terminal, the first access request carrying user information of the user terminal;

a second receiving module 620, configured to send a second access request to an authentication server, the second access request carrying the user information;

a key receiving module 630, configured to receive a master key sent by the authentication server and corresponding to the user information, the master key being a key that is generated through negotiation by the authentication server after receiving the second access request, when verifying that a radio access point is a trusted radio access point, and after successfully performing a first identity authentication on the user terminal; and a network connection module 640, configured to negotiate with the user terminal according to respective master keys to establish an encrypted wireless network connection.

In conclusion, by means of the wireless network access apparatus provided in this embodiment, a first access request sent by a user terminal is received; a second access request is sent to an authentication server; a master key sent by the authentication server and corresponding to user information is received; and an encrypted wireless network connection is established through negotiation with the user terminal according to respective master keys. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the respective master keys, thereby improving security of both the data transmitted by the user terminal and the data within the user terminal.

Figure 7:
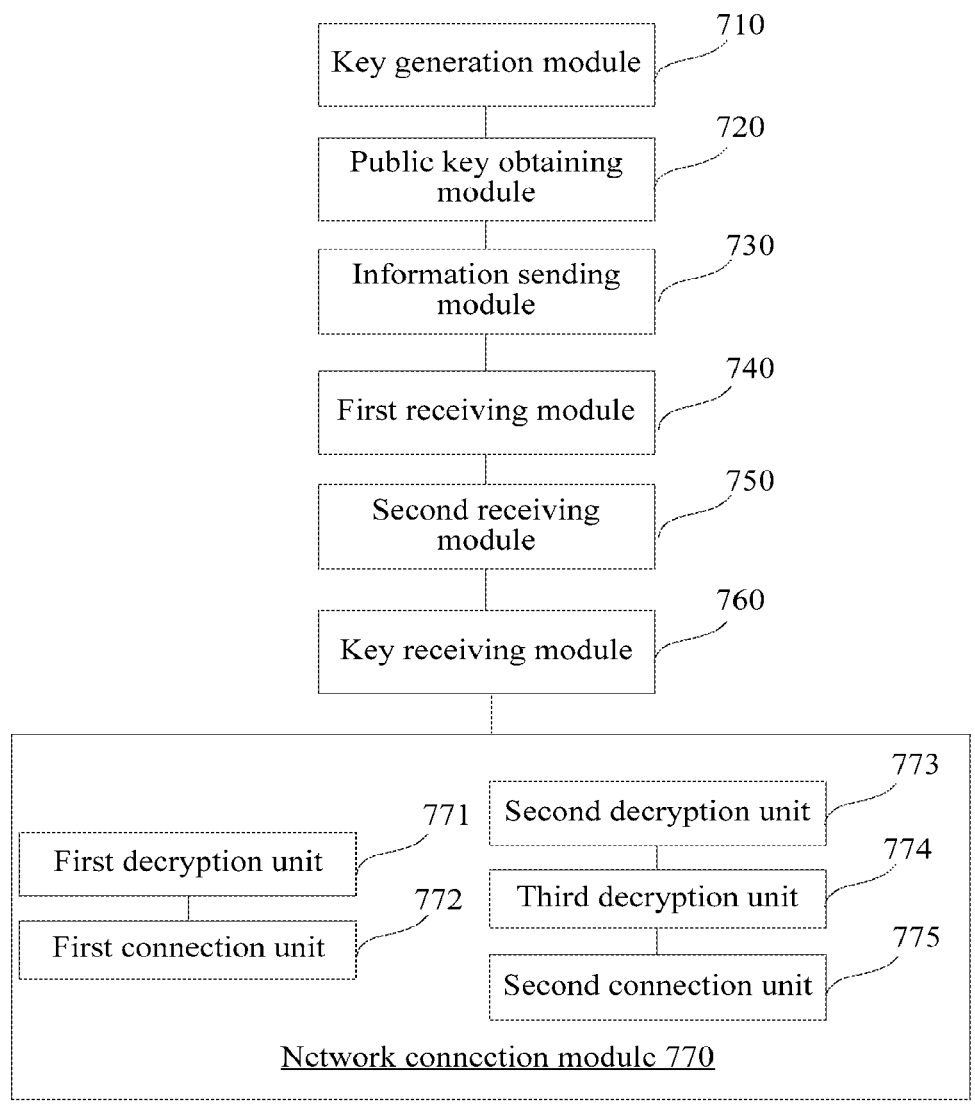
FIG. 7 is a structural block diagram of a wireless network connection apparatus according to an embodiment of this application.

Referring to FIG. 7, FIG. 7 is a structural block diagram of a wireless network connection apparatus according to another embodiment of this application. The wireless network connection apparatus may be implemented to be all or a part of the radio access point in FIG. 1A by using software, hardware, or a combination thereof. The wireless network connection apparatus includes:

a key generation module 710, configured to generate a second public key and a second private key that correspond to the radio access point;

a public key obtaining module 720, configured to obtain a first public key corresponding to the authentication server; and an information sending module 730, configured to send an identity authentication request to the authentication server, the identity authentication request carrying authentication information and a second public key corresponding to the radio access point, both the authentication information and the second public key corresponding to the radio access point being encrypted by using the first public key corresponding to the authentication server, and the authentication information including at least hardware information and/or owner information.

In a possible implementation, the authentication information is information that is obtained after an encryption is performed by using the second private key corresponding to the radio access point.

The first receiving module 740 is configured to receive a first access request sent by a user terminal, the first access request carrying user information of the user terminal.

The second receiving module 750 is configured to send a second access request to an authentication server, the second access request carrying the user information.

The key receiving module 760 is configured to receive a master key sent by the authentication server and corresponding to the user information, the master key being a key that is generated through negotiation by the authentication server after receiving the second access request, when verifying that a radio access point is a trusted radio access point, and after successfully performing a first identity authentication on the user terminal.

In a possible implementation, the key receiving module 760 is further configured to receive a master key after a first encryption sent by the authentication server, the master key after the first encryption being a master key that is obtained after the authentication server encrypts, when the radio access point is a trusted radio access point, the master key by using a second public key corresponding to the radio access point.

In another possible implementation, the key receiving module 760 is further configured to receive a master key after a second encryption sent by the authentication server, the master key after the second encryption being a master key that is obtained after the authentication server performs, when the radio access point is a trusted radio access point, a first encryption on the master key by using a second public key corresponding to the radio access point and then performs the second encryption on the master key after the first encryption by using a first private key corresponding to the authentication server.

A network connection module 770 is configured to negotiate with the user terminal according to respective master keys to establish an encrypted wireless network connection.

In a first possible implementation, the network connection module 770 may include a first decryption unit 771 and a first connection unit 772.

The first decryption unit 771 is configured to decrypt the master key after the first encryption by using a second private key corresponding to the radio access point, to obtain the master key.

The first connection unit 772 is configured to negotiate with the user terminal according to respective master keys to establish the encrypted wireless network connection.

In a second possible implementation, the network connection module 770 may include a second decryption unit 773, a third decryption unit 774, and a second connection unit 775.

The second decryption unit 773 is configured to decrypt the master key after the second encryption by using a first public key corresponding to the authentication server, to obtain a second ciphertext.

The third decryption unit 774 is configured to decrypt the second ciphertext by using a second private key corresponding to the radio access point, to obtain the master key.

The second connection unit 775 is configured to negotiate with the user terminal according to respective master keys to establish the encrypted wireless network connection.

The second ciphertext is a ciphertext that is obtained after the authentication server encrypts the master key by using the second public key corresponding to the radio access point.

In a third possible implementation, the network connection module 770 is further configured to: negotiate with the user terminal by using the respective master keys to establish a temporary key used in a current connection, and establish the encrypted wireless network connection to the user terminal according to the temporary key.

In conclusion, by means of the wireless network access apparatus provided in this embodiment, a first access request sent by a user terminal is received; a second access request is sent to an authentication server; a master key sent by the authentication server and corresponding to user information is received; and an encrypted wireless network connection is established through negotiation with the user terminal according to respective master keys. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to the respective master keys, thereby improving security of both the data transmitted by the user terminal and the data within the user terminal.

Figure 8:
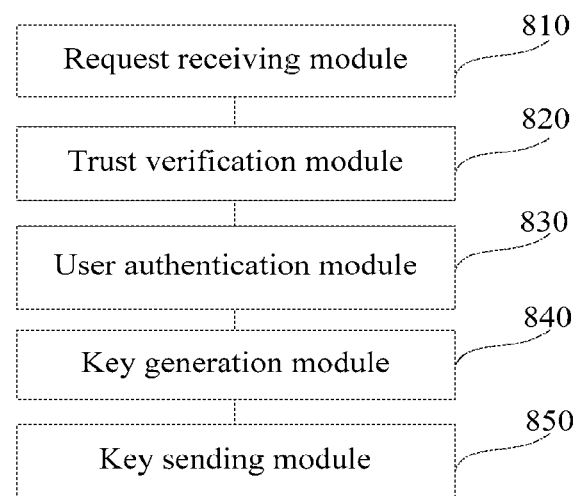
FIG. 8 is a structural block diagram of a wireless network connection apparatus according to an embodiment of this application.

Referring to FIG. 8, FIG. 8 is a structural block diagram of a wireless network connection apparatus according to an embodiment of this application. The wireless network connection apparatus may be implemented to be all or a part of the authentication server in FIG. 1A by using software, hardware, or a combination thereof. The wireless network connection apparatus includes:

a request receiving module 810, configured to receive a second access request sent by a radio access point, the second access request carrying user information;

a trust verification module 820, configured to verify whether the radio access point is a trusted radio access point after the second access request is received;

a user authentication module 830, configured to perform a first identity authentication on a user terminal when the radio access point is a trusted radio access point;

a key generation module 840, configured to: negotiate with the user terminal to generate a master key and send the master key to the user terminal when the first identity authentication succeeds; and a key sending module 850, configured to send key information corresponding to the user information to the radio access point when the radio access point is a trusted radio access point, so that the radio access point negotiates with the user terminal according to respective master keys to establish an encrypted wireless network connection.

In conclusion, by means of the wireless network connection apparatus provided in this embodiment, a second access request sent by a radio access point is received; it is verified whether the radio access point is a trusted radio access point after the second access request is received; a first identity authentication is performed with a user terminal when the radio access point is a trusted radio access point; a master key is generated through negotiation with the user terminal when the first identity authentication succeeds, and the master key is sent to the user terminal; and the master key corresponding to user information is sent to the radio access point. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to respective master keys, thereby improving security of both the data transmitted by the user terminal and the data within the user terminal.

Figure 9:
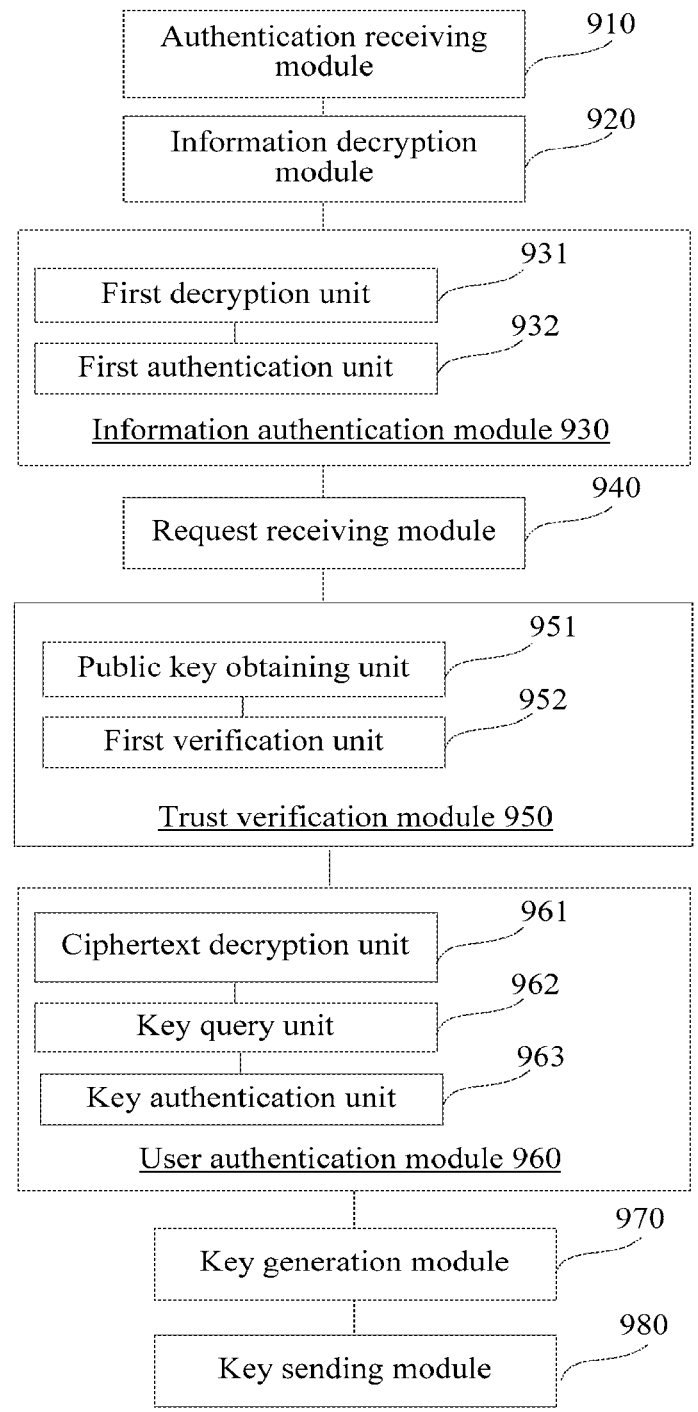
FIG. 9 is a structural block diagram of a wireless network connection apparatus according to an embodiment of this application.

Referring to FIG. 9, FIG. 9 is a structural block diagram of a wireless network connection apparatus according to another embodiment of this application. The wireless network connection apparatus may be implemented to be all or a part of the authentication server in FIG. 1A by using software, hardware, or a combination thereof. The wireless network connection apparatus includes:

an authentication receiving module 910, configured to receive an identity authentication request sent by a radio access point, the identity authentication request carrying authentication information and a second public key corresponding to the radio access point, both the authentication information and the second public key corresponding to the radio access point being encrypted by using a first public key corresponding to the authentication server, and the authentication information including at least hardware information and/or owner information;

an information decryption module 920, configured to decrypt the identity authentication request by using a first private key corresponding to the authentication server, to obtain the authentication information and the second public key corresponding to the radio access point; and an information authentication module 930, configured to: perform a second identity authentication on the authentication information, and add the second public key corresponding to the radio access point to a set of trusted public keys when the second identity authentication succeeds.

In some examples, the authentication information is information that is obtained after the radio access point performs an encryption by using a second private key corresponding to the radio access point.

In a first possible implementation, the information authentication module 930 may include a first decryption unit 931 and a first authentication unit 932.

The first decryption unit 931 is configured to decrypt the authentication information by using the second public key corresponding to the radio access point, to obtain the hardware information and/or the owner information.

The first authentication unit 932 is configured to: perform the second identity authentication on the hardware information and/or the owner information, and add the second public key corresponding to the radio access point to the set of trusted public keys when the second identity authentication succeeds.

A request receiving module 940 is configured to receive a second access request sent by the radio access point, the second access request carrying user information.

A trust verification module 950 is configured to verify whether the radio access point is a trusted radio access point after the second access request is received.

In a possible implementation, in this embodiment, the trust verification module 950 may include a public key obtaining unit 951 and a first verification unit 952.

The public key obtaining unit 951 is configured to obtain a first ciphertext carried in the second access request and the second public key corresponding to the radio access point.

In some examples, the public key obtaining unit 951 is further configured to decrypt the second access request by using the first private key corresponding to the authentication server, to obtain the first ciphertext and the second public key corresponding to the radio access point.

The second access request is a request of the radio access point for encrypting the first ciphertext and the second public key corresponding to the radio access point by using the first public key corresponding to the authentication server.

The first verification unit 952 is configured to: verify whether the second public key corresponding to the radio access point exists in the set of trusted public keys; and verify that the radio access point is a trusted radio access point if the second public key corresponding to the radio access point exists in the set of trusted public keys.

The set of trusted public keys stores a second public key corresponding to a radio access point on which a second identity authentication has been successfully performed.

A user authentication module 960 is configured to perform a first identity authentication on a user terminal when the radio access point is a trusted radio access point.

In a possible implementation, in this embodiment, the user authentication module 960 may include a ciphertext decryption unit 961, a key query unit 962, and a key authentication unit 963.

The ciphertext decryption unit 961 is configured to decrypt the first ciphertext carried in the access request by using the second public key corresponding to the radio access point when the radio access point is a trusted radio access point, to obtain the user information.

The key query unit 962 is configured to query key information corresponding to the user information.

The key authentication unit 963 is configured to perform the first identity authentication on the user terminal according to the key information.

The first ciphertext is a ciphertext that is obtained after the radio access point encrypts the user information by using a second private key corresponding to the radio access point.

A key generation module 970 is configured to: negotiate with the user terminal to generate a master key and send the master key to the user terminal when the first identity authentication succeeds.

A key sending module 980 is configured to send the master key corresponding to the user information to the radio access point, so that the radio access point negotiates with the user terminal according to respective master keys to establish an encrypted wireless network connection.

In some examples, the key sending module 980 is further configured to: perform, by using the second public key corresponding to the radio access point, a first encryption on the master key generated through negotiation, and send the master key after the first encryption to the radio access point.

In some examples, the key sending module 980 is further configured to: perform a second encryption on the master key after the first encryption by using the first private key corresponding to the authentication server, and send the master key after the second encryption to the radio access point.

In conclusion, by means of the wireless network connection apparatus provided in this embodiment, a second access request sent by a radio access point is received; it is verified whether the radio access point is a trusted radio access point after the second access request is received; a first identity authentication is performed with a user terminal when the radio access point is a trusted radio access point; a master key is generated through negotiation with the user terminal when the first identity authentication succeeds, and the master key is sent to the user terminal; and the master key corresponding to user information is sent to the radio access point. In this way, a problem that both data transmitted by the user terminal to fake public Wi-Fi and data within the user terminal are under security threats when a user causes, by using a related access method, the user terminal to access the fake public Wi-Fi is resolved. Therefore, when the authentication server performs identity authentication on a radio access point, a trusted radio access point can obtain the master key corresponding to the user information, and the encrypted wireless network connection is established to the user terminal according to respective master keys, thereby improving security of both the data transmitted by the user terminal and the data within the user terminal.

Figure 10:
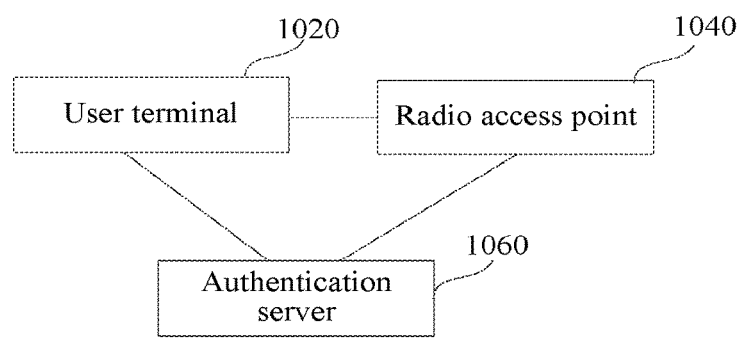
FIG. 10 is a structural block diagram of a wireless network connection system according to an embodiment of this application.

Referring to FIG. 10, FIG. 10 is a structural block diagram of a wireless network connection system according to an embodiment of this application. The system includes a user terminal 1020, a radio access point 1040, and an authentication server 1060.

The user terminal 1020 is configured to: send a first access request to the radio access point, and perform a first identity authentication on the authentication server.

The radio access point 1040 includes the wireless network connection apparatus according to either of the embodiment shown in FIG. 6 or the embodiment shown in FIG. 7.

The authentication server 1060 includes the wireless network connection apparatus according to either of the embodiment shown in FIG. 8 or the embodiment shown in FIG. 9.

The embodiments of this application further provide a radio access point authentication method.

Figure 11:
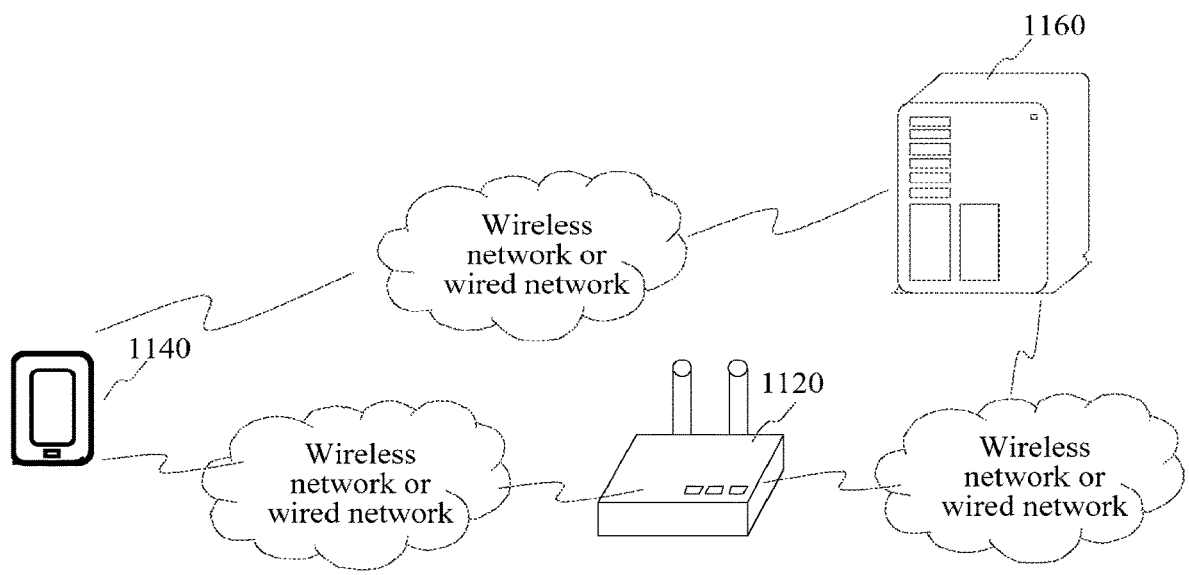
FIG. 11 is a schematic structural diagram of a radio access point authentication system according to an embodiment of this application.

Referring to FIG. 11, FIG. 11 is a schematic structural diagram of a radio access point system according to an exemplary embodiment of this application. The radio access point system includes a radio access point 1120, a management terminal 1140, and an authentication server 1160.

The radio access point 1120 may be a general term for devices providing a wireless network access service such as a router, a Wi-Fi hotspot, and a wireless gateway. In this embodiment of this application, the radio access point 1120 is described by using a router as an example. The radio access point 1120 is connected to the management terminal 1140 by using a wireless network. Before the radio access point 1120 establishes a wireless network connection to a user terminal (not shown in the figure), the authentication server 1160 needs to perform identity authentication on the radio access point 1120. The radio access point 1120 establishes a connection to the authentication server 1160 by using a wireless network or a wired network. A manner of communication between the radio access point 1120 and the authentication server 1160 is not limited in this embodiment of this application.

The management terminal 1140 is the merchant terminal 180 above. The management terminal 1140 may be a mobile phone, a tablet computer, an e-book reader, a portable laptop computer, a desktop computer, or the like. In some examples, an application program specially used for managing public Wi-Fi is installed on the management terminal 1140, for example, Tencent QQ, WeChat, or microblog.

The management terminal 1140 establishes a connection to the authentication server 1160 by using a wireless network or a wired network. In some examples, the management terminal 1140 sends information to the authentication server 1160 through an encrypted channel. The encrypted channel is an independent channel between the management terminal 1140 and the authentication server 1160. For example, the management terminal 1140 sends information through an https channel. A manner of communication between the management terminal 1140 and the authentication server 1160 is not limited in this embodiment of this application.

The authentication server 1160 stores a list of trusted radio access points, and a second public key and a second private key that correspond to the authentication server 1160. In some examples, there is more than one second public key corresponding to the authentication server 1160, and different second public keys are separately used for a signature, a session, and the like. The authentication server 1160 may be one server, a server cluster including multiple servers, or a cloud computing center.

Figure 12:
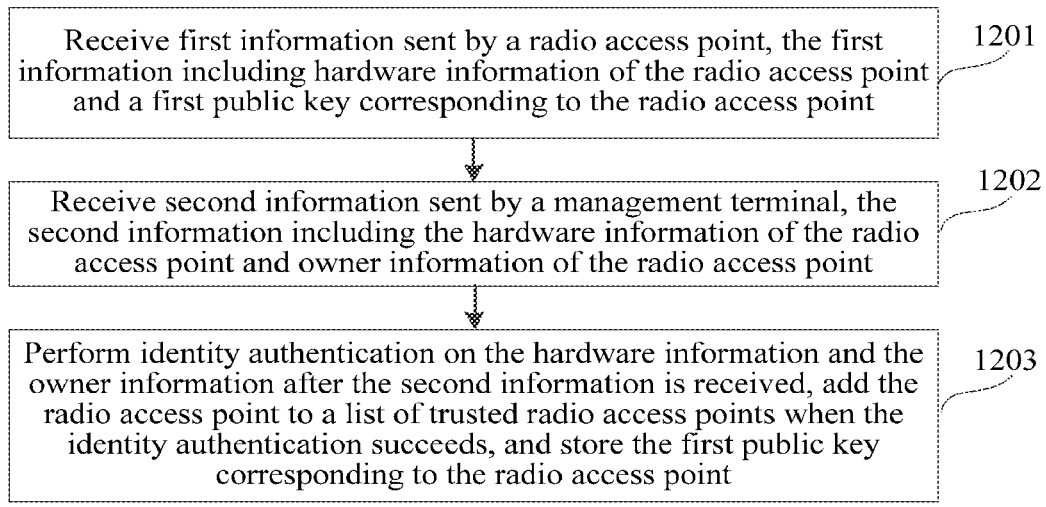
FIG. 12 is a flowchart of a radio access point authentication method according to an embodiment of this application.

Referring to FIG. 12, FIG. 12 is a flowchart of a radio access point authentication method according to an embodiment of this application. This embodiment is described by using an example in which the radio access point authentication method is applied to the authentication server 1160 shown in FIG. 11. The method includes the following steps.

Step 1201. Receive first information sent by a radio access point, the first information including hardware information of the radio access point and a first public key corresponding to the radio access point.

The hardware information includes an SSID of the radio access point, a BSSID of the radio access point, and a MAC address of the radio access point.

Step 1202. Receive second information sent by a management terminal, the second information including the hardware information of the radio access point and owner information of the radio access point.

The owner information includes but is not limited to at least one of: latitude/longitude coordinates, an owner name, or an owner address.

Step 1203. Perform identity authentication on the hardware information and the owner information after the second information is received, add the radio access point to a list of trusted radio access points when the identity authentication succeeds, and store the first public key corresponding to the radio access point.

In conclusion, in the radio access point authentication method provided in this embodiment, first information sent by a radio access point is received; second information sent by a management terminal is received; and identity authentication is performed on hardware information and owner information after the second information is received, the radio access point is added to a list of trusted radio access points when the identity authentication succeeds, and a first public key corresponding to the radio access point is stored. In this way, a problem that both data transmitted by the user terminal to fake public Wi-Fi and data within the user terminal are under security threats because the authentication server considers by default the fake public Wi-Fi as trusted public Wi-Fi in the related authentication method is resolved. Therefore, when the authentication server performs identity authentication on a radio access point, identity authentication performed by the authentication server on a real radio access point can succeed, thereby improving security of both the data transmitted by the user terminal and the data within the user terminal.

Figure 13:
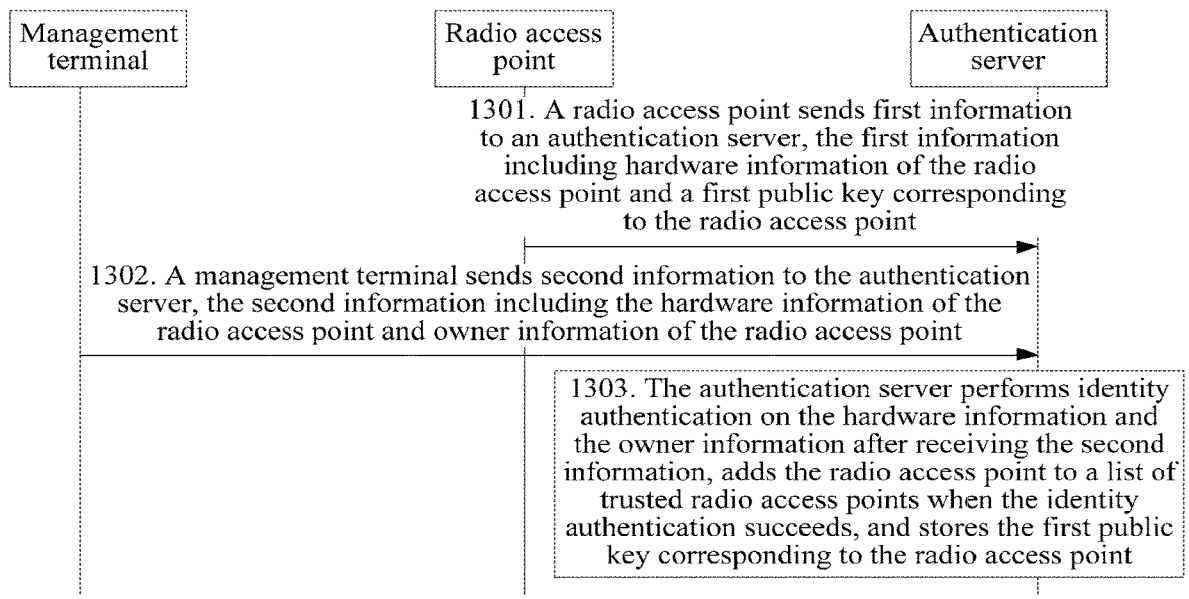
FIG. 13 is a flowchart of a radio access point authentication method according to an embodiment of this application.

Referring to FIG. 13, FIG. 13 is a flowchart of a radio access point authentication method according to another embodiment of this application. This embodiment is described by using an example in which the radio access point authentication method is applied to the radio access point authentication system shown in FIG. 11. The method includes the following steps.

Step 1301. A radio access point sends first information to an authentication server, the first information including hardware information of the radio access point and a first public key corresponding to the radio access point.

The hardware information includes an SSID of the radio access point, a BSSID of the radio access point, and a MAC address of the radio access point.

Step 1302. A management terminal sends second information to the authentication server, the second information including the hardware information of the radio access point and owner information of the radio access point.

The owner information includes but is not limited to at least one of: latitude/longitude coordinates, an owner name, or an owner address.

Step 1303. The authentication server performs identity authentication on the hardware information and the owner information after receiving the second information, adds the radio access point to a list of trusted radio access points when the identity authentication succeeds, and stores the first public key corresponding to the radio access point.

In conclusion, in the radio access point authentication method provided in this embodiment, a radio access point sends first information to an authentication server; a management terminal sends second information to the authentication server; and the authentication server performs identity authentication on hardware information and owner information after receiving the second information, adds the radio access point to a list of trusted radio access points when the identity authentication succeeds, and stores a first public key corresponding to the radio access point. In this way, a problem that both data transmitted by the user terminal to fake public Wi-Fi and data within the user terminal are under security threats because the authentication server considers by default the fake public Wi-Fi as trusted public Wi-Fi in the related authentication method is resolved. Therefore, when the authentication server performs identity authentication on a radio access point, identity authentication performed by the authentication server on a real radio access point can succeed, thereby improving security of both the data transmitted by the user terminal and the data within the user terminal.

Figure 14:
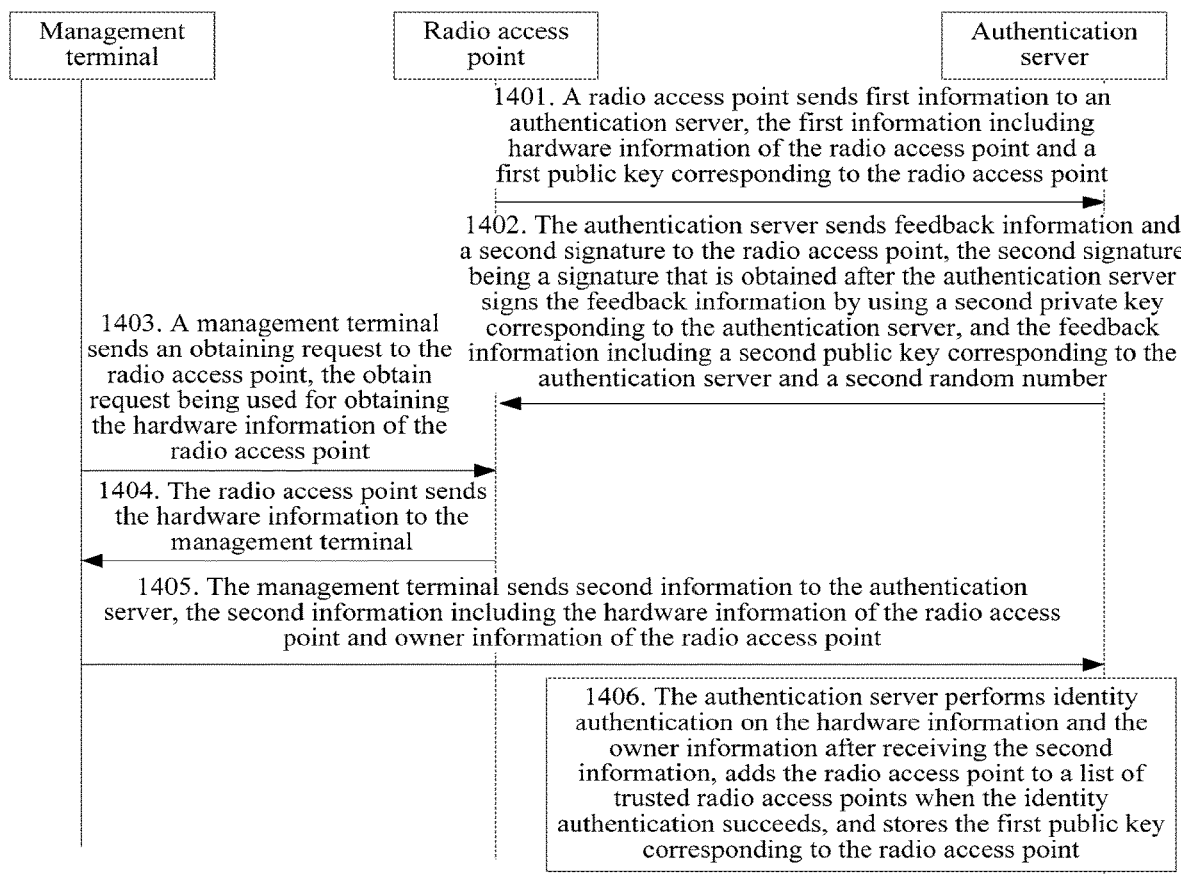
FIG. 14 is a flowchart of a radio access point authentication method according to an embodiment of this application.

Referring to FIG. 14, FIG. 14 is a flowchart of a radio access point authentication method according to still another embodiment of this application. This embodiment is described by using an example in which the radio access point authentication method is applied to the wireless network access system shown in FIG. 11. The method includes the following steps.

Step 1401. A radio access point sends first information to an authentication server, the first information including hardware information of the radio access point and a first public key corresponding to the radio access point.

The radio access point first sends the first information to the authentication server, the first information including the hardware information of the radio access point and the first public key corresponding to the radio access point.

The hardware information of the radio access point includes an SSID of the radio access point, a BSSID of the radio access point, and a MAC address of the radio access point.

In some examples, one radio access point at least includes one SSID and one BSSID. If one radio access point includes multiple SSIDs and multiple BSSIDs, the radio access point adds both the multiple SSIDs and the multiple BSSIDs to the hardware information and sends the hardware information to the authentication server.

Before sending the first information to the authentication server, the radio access point generates the first public key and a first private key that correspond to the radio access point, and sends the first public key corresponding to the radio access point to the authentication server.

In some examples, the first information sent by the radio access point to the authentication server further carries a first random number.

For example, the radio access point randomly generates a random number of 12 bytes, and the radio access point encodes the generated 12-byte random number to obtain a first random number of 16 bytes.

In some examples, the first information sent by the radio access point to the authentication server further carries a firmware/plug-in version number.

In some examples, the radio access point performs a first signature on the first information by using a first private key corresponding to the radio access point, and sends the first information and the first signature to the authentication server.

In a schematic example, the radio access point adds all of the hardware information, the first public key corresponding to the radio access point, the first random number, and the firmware/plug-in version number to the first information. The radio access point signs the first information by using the first private key corresponding to the radio access point. The radio access point sends both the first information and the first signature to the authentication server.

For example, the radio access point sends the first information and the first signature to the authentication server through a channel whose uniform resource locator (URL) is "http://[domain name]/router/inform".

Exemplarily, the first information sent by the radio access point to the authentication server includes content shown in Table 3:

represents the second SSID of the radio access point; bssid2 represents the second BSSID of the radio access point; pbk represents the second public key corresponding to the radio access point, and the second public key is obtained by means of base64 encoding after the radio access point performs calculation according to the Curve25519 algorithm; x represents the first random number generated by the radio access point, and the first random number is a random number of 16 bytes obtained by performing base64 encoding on a random number of 12 bytes randomly generated by the radio access point; and sig represents the first signature obtained by signing the foregoing data by using the second private key corresponding to the radio access point. All information in the first information is character string type information.

Correspondingly, the authentication server receives the first information sent by the radio access point.

Step 1402. The authentication server sends feedback information and a second signature to the radio access point, the second signature being a signature that is obtained after the authentication server signs the feedback information by using a second private key corresponding to the authentication server, and the feedback information including a second public key corresponding to the authentication server and a second random number.

After receiving the first information sent by the radio access point, the authentication server verifies, by using the first public key corresponding to the radio access point, whether the first information is tempered, and sends the feedback information and the second signature to the radio access point when the first information is not tempered. In some examples, the feedback information includes the second public key corresponding to the authentication server and the second random number. The authentication server performs the second signature on the feedback information by using the second private key corresponding to the authentication server. The authentication server sends both the feedback information and the second signature to the radio access point.

In some examples, the feedback information may further include a latest firmware/plug-in version number corre-

TABLE 3

| Field | Type | Description | Note |
|---|---|---|---|
| ver | String | Firmware/plug-in version number | |
| mac | String | MAC address of radio access point | |
| ssid | String | SSID of radio access point | |
| bssid | String | BSSID of radio access point | |
| ssid2 | String | Second SSID of radio access point | The radio access point supports multiple SSIDs |
| bssid2 | String | Second BSSID of radio access point | |
| pbk | String | Second public key corresponding to radio access point | Generate the second public key by using a Curve25519 algorithm, and perform encoding by using base64 |
| x | String | First random number | Encode a random number of 12 bytes by using base64, to obtain a first random number of 16 bytes |
| sig | String | Sign the foregoing data by using a second private key corresponding to the radio access point | Sign the foregoing data by using an Ed25519 algorithm |

As shown in Table 3, the radio access point shown in Table 3 includes two SSIDs. The fields represent identifiers of different information. For example, ver represents a current firmware/plug-in version number of the radio access point; mac represents the MAC address of the radio access point; ssid represents the SSID of the radio access point; bssid represents the BSSID of the radio access point; ssid2 sponding to the radio access point. The latest firmware/plug-in version number corresponding to the radio access point is used for detecting whether the firmware/plug-in in the radio access point needs to be updated.

Exemplarily, the feedback information and the second signature that are sent by the authentication server to the radio access point are shown in Table 4:

TABLE 4

| Field | Type | Description | Note |
|---|---|---|---|
| ret | Int | Return code | |
| msg | String | Text information of return code | |
| ver | String | Latest firmware/plug-in version number | Used for determining whether the firmware/plug-in needs to be updated |
| pbk | String | First public key corresponding to the authentication server | |
| y | String | Second random number | Used for calculating an encryption key |
| sig | String | Sign the foregoing data by using the first private key corresponding to the authentication server | Verify the signature by using the first public key corresponding to the authentication server |

As shown in Table 4, the fields represent identifiers of different information. For example, ret represents the return code; msg represents the text information of the return code; ver represents the latest firmware/plug-in version number of the radio access point; pbk represents the first public key corresponding to the authentication server; y represents the second random number generated by the authentication server, and the second random number is used for calculating the encryption key; and sig represents that the foregoing data is signed by using the first private key corresponding to the authentication server, and the radio access point verifies the signature by using the first public key corresponding to the authentication server. The type refers to types of all the information in the second information, including integral type and character string.

Correspondingly, the radio access point receives the feedback information and the second signature that are sent by the authentication server.

Step 1403. A management terminal sends an obtaining request to the radio access point, the obtain request being used for obtaining the hardware information of the radio access point.

In some examples, the radio access point provides a default wireless network that does not need verification, and the management terminal accesses the default wireless network. Subsequently, the management terminal sends an obtaining request to the radio access point by using the default wireless network, the obtain request being used for obtaining the hardware information corresponding to the radio access point.

For example, the management terminal sends the obtaining request to the radio access point through a channel whose URL is "http://[domain name]/admin/getrouterinfo". In some examples, the management terminal sends the obtaining request to the radio access point by using the instant messaging program "WeChat". In this case, the obtaining request carries an openid identity after WeChat is logged in to, and the openid identity is an identifier of the management terminal.

In some examples, the obtaining request carries the identifier of the management terminal.

In some examples, the management terminal establishes a connection to the radio access point by using the default wireless network provided by the radio access point, and the management terminal sends the obtaining request to the radio access point by using the wireless network.

Exemplarily, the obtaining request sent by the management terminal to the radio access point is shown in Table 5:

TABLE 5

| Field | Type | Description | Note |
|---|---|---|---|
| openid | String | Openid after WeChat is logged in to | Sent to the radio access point |

As shown in Table 5, the field openid represents the identifier of the management terminal, and the type is character string.

Correspondingly, the radio access point receives the obtaining request sent by the management terminal.

Step 1404. The radio access point sends the hardware information to the management terminal.

After receiving the obtaining request sent by the management terminal, the radio access point sends the hardware information to the management terminal according to the obtaining request.

In some examples, the hardware information sent by the radio access point to the management terminal includes but is not limited to at least one of the MAC address of the radio access point, the SSID of the radio access point, and the BSSID of the radio access point.

In some examples, after receiving the obtaining request sent by the management terminal, the radio access point verifies the identifier of the management terminal carried in the obtaining request, and sends the hardware information to the management terminal when verifying that the identifier has management permission.

In some examples, the management terminal prestores the first public key corresponding to the radio access point. The radio access point performs a third signature on all or some of the hardware information and the identifier of the management terminal by using the first private key corresponding to the radio access point.

For example, the radio access point performs the third signature on the MAC address of the radio access point and the identifier of the management terminal by using the first private key corresponding to the radio access point.

In some examples, the radio access point sends the hardware information and the third signature to the management terminal.

Exemplarily, the hardware information sent by the radio access point to the management terminal is shown in Table 6:

TABLE 6

| Field | Type | Description | Note |
|---|---|---|---|
| ret | Int | Return code | |
| msg | String | Text information of return code | |

TABLE 6-continued

| Field | Type | Description | Note |
|---|---|---|---|
| mac | String | MAC address of radio access point | |
| ssid | String | SSID of radio access point | If the radio access point supports multiple SSIDs and BSSIDs, it is defined as an array ssidlist. |
| bssid | String | BSSID of radio access point | |
| sig | String | Sign openid and the MAC address by using a second private key corresponding to the radio access point | Signature data format openid = abc & mac = xxx |

As shown in Table 6, the fields represent identifiers of different information. For example, ret represents the return code; msg represents the text information of the return code; mac represents the MAC address of the radio access point; ssid represents the SSID of the radio access point; bssid represents the BSSID of the radio access point, and if the radio access point supports multiple SSIDs and BSSIDs, it is defined as an array ssidlist, showing multiple SSIDs and BSSIDs; and sig represents that openid and the MAC address are signed by using the second private key corresponding to the radio access point. The type refers to types of all the information in the second information, including integral type and character string.

Correspondingly, the management terminal receives the hardware information and the third signature that are sent by the radio access point, and verifies the third signature.

Step 1405. The management terminal sends second information to the authentication server, the second information including the hardware information of the radio access point and owner information of the radio access point.

After receiving the hardware information sent by the radio access point, the management terminal sends the second information to the authentication server, the second information including the hardware information of the radio access point and the owner information of the radio access point.

In some examples, the management terminal sends the second information to the authentication server by using an encrypted connection. For example, the encrypted connection is a connection for which an https technology is used.

For example, the management terminal sends the second information to the authentication server through a channel whose URL is "https://[domain name]/admin/bind".

The owner information of the radio access point includes but is not limited to at least one of: latitude/longitude coordinates, an owner name, or an owner address. In some examples, latitude/longitude coordinates of an owner are automatically obtained by the management terminal by means of localization.

In this embodiment, information included in the owner information of the radio access point is not specifically limited.

In some examples, the second information further includes the identifier of the management terminal and an access token of the management terminal. The access token of the management terminal is used for indicating that the management terminal has permission to request the authentication server to perform authentication on the radio access point.

In some examples, the second information further includes the third signature. The third signature is a signature that is obtained after the radio access point signs some or all of the hardware information and the identifier of the management terminal by using the first private key corresponding to the radio access point.

Exemplarily, the second information sent by the management terminal to the authentication server is shown in Table 7:

TABLE 7

| Field | Type | Description | Note |
|---|---|---|---|
| openid | String | Openid after WeChat is logged in to | |
| token | String | Accesstoken after WeChat is logged in to | |
| mac | String | MAC address of radio access point | |
| ssid | String | SSID of radio access point | |
| bssid | String | BSSID of radio access point | |
| mark | String | Note of SSID of radio access point | |
| ssid2 | String | Second SSID of radio access point | One radio access point supports multiple SSIDs and BSSIDs |
| bssid2 | String | Second BSSID of radio access point | |
| mark2 | String | Note of second SSID of radio access point | |
| sig | String | Sign openid and the MAC address by using a second private key corresponding to the radio access point | |
| position | String | Latitude/longitude coordinates | Automatically obtained by the management terminal by means of localization |
| company | String | Owner name | |
| address | String | Owner address | |

As shown in Table 7, the fields represent identifiers of different information. For example, openid represents the identifier of the management terminal; token represents the access token of the management terminal; mac represents the MAC address of the radio access point; ssid represents the SSID of the radio access point; bssid represents the BSSID of the radio access point; mark represents the note of the SSID of the radio access point; ssid2 represents the second SSID of the radio access point; bssid2 represents the second BSSID of the radio access point; mark2 represents the note of the second SSID of the radio access point; sig represents that openid and the MAC address are signed by using the second private key corresponding to the radio access point; position represents the latitude/longitude coordinates of the owner; company represents the owner name; and address represents the owner address. The type means that all the information in the second information is character string type information.

Correspondingly, the authentication server receives the second information sent by the management terminal.

Step 1406. The authentication server performs identity authentication on the hardware information and the owner information after receiving the second information, adds the radio access point to a list of trusted radio access points when the identity authentication succeeds, and stores the first public key corresponding to the radio access point.

The authentication server obtains the hardware information and the owner information from the second information after receiving the second information sent by the management terminal, and performs identity authentication on the obtained hardware information and the obtained owner information.

In some examples, the identity authentication performed by the authentication server on the hardware information and the owner information includes:

1) The authentication server authenticates whether the hardware information sent by the management terminal matches the hardware information sent by the radio access point.

2) The authentication server authenticates whether the owner information sent by the management terminal is correct.

The authentication server adds the radio access point to the list of trusted radio access points when the identity authentication succeeds, and stores the first public key corresponding to the radio access point. That the authentication server adds the radio access point to the list of trusted radio access points means that the authentication server adds an SSID provided by a radio access point on which the identity authentication has been successfully performed to the list of trusted radio access points. In addition, the authentication server stores the first public key corresponding to the radio access point, so that the authentication server authenticates, during the identity authentication on the radio access point, whether the first public key provided by the radio access point exists in a list of public keys corresponding to the list of trusted radio access points.

The first public key corresponding to the radio access point stored in the authentication server is used for performing identity authentication on the radio access point in a subsequent process. The process of identity authentication performed by the authentication server on the radio access point includes: receiving, by the authentication server, the first public key provided by the radio access point, and verifying, by the authentication server, whether the first public key corresponding to the radio access point exists in a list of public keys corresponding to the list of trusted radio access points. The list of public keys is a list of public keys corresponding to the trusted radio access points. When the first public key provided by the radio access point exists in the list of public keys corresponding to the list of trusted radio access points, the authentication server determines that the radio access point is a trusted radio access point; when the first public key provided by the radio access point does not exist in the list of public keys corresponding to the list of trusted radio access points, the authentication server determines that the radio access point is not a trusted radio access point.

In conclusion, in the radio access point authentication method provided in this embodiment, a radio access point sends first information to an authentication server; a management terminal sends second information to the authentication server; and the authentication server performs identity authentication on hardware information and owner information after receiving the second information, adds the radio access point to a list of trusted radio access points when the identity authentication succeeds, and stores a first public key corresponding to the radio access point. In this way, a problem that both data transmitted by the user terminal to fake public Wi-Fi and data within the user terminal are under security threats because the authentication server considers by default the fake public Wi-Fi as trusted public Wi-Fi in the related authentication method is resolved. Therefore, when the authentication server performs identity authentication on a radio access point, identity authentication performed by the authentication server on a real radio access point can succeed, thereby improving security of both the data transmitted by the user terminal and the data within the user terminal.

Moreover, the radio access point performs a first signature on the first information by using a first private key corresponding to the radio access point, and sends the first information and the first signature to the authentication server, so that the first information is not tempered, thereby improving security of the first information.

In addition, the radio access point performs a third signature on some or all of the hardware information and an identifier of the management terminal by using the first private key corresponding to the radio access point, thereby ensuring that the hardware information of the radio access point received by the management terminal is not tempered, and improving data security.

It is noted that the steps related to the side of the authentication server in this embodiment may be independently implemented as the radio access point authentication method of the side of the authentication server.

Figure 15A:
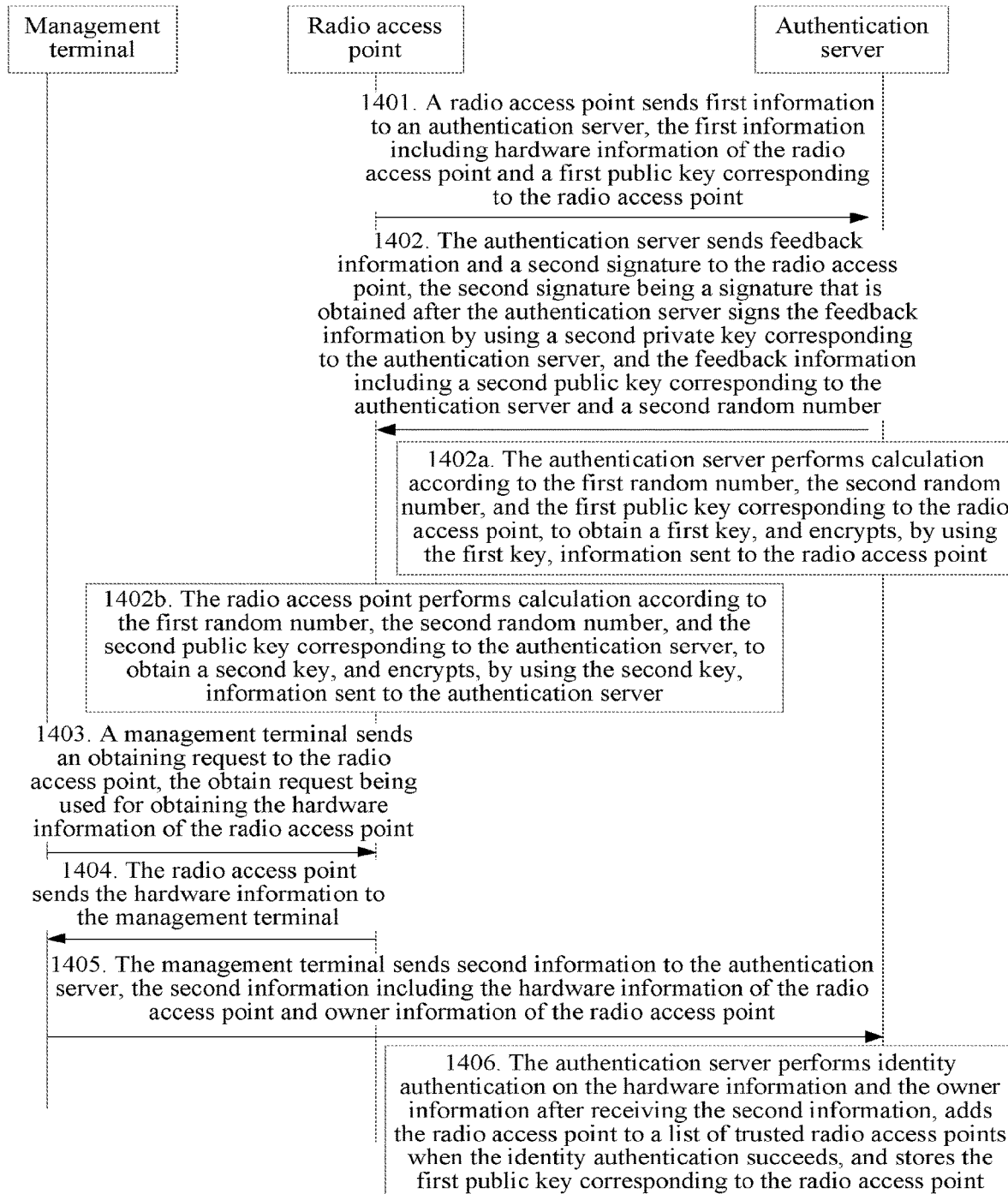
FIG. 15A is a flowchart of a radio access point authentication method according to an embodiment of this application.

Based on the radio access point authentication method shown in FIG. 14, information transmission between the authentication server and the radio access point may be performed in an encrypted manner. That is, after step 1402, the following steps may further be included, as shown in FIG. 15A:

Step 1402*a*. The authentication server performs calculation according to the first random number, the second random number, and the first public key corresponding to the radio access point, to obtain a first key, and encrypts, by using the first key, information sent to the radio access point.

After sending the feedback information and the second signature to the radio access point, the authentication server performs calculation according to the first random number, the second random number, and the first public key corresponding to the radio access point, to obtain the first key. The authentication server encrypts, by using the first key, the information sent to the radio access point.

In some examples, information required by the authentication server to calculate the first key further includes a sequence number of a data packet. The sequence number of the data packet is a sequence number corresponding to the information sent by the authentication server to the radio access point.

For example, when the authentication server sends information to the radio access point for the first time, the sequence number of the data packet is 1. When the authentication server sends information to the radio access point for the second time, the sequence number of the data packet is 2. The rest can be deduced by analogy.

Exemplarily, the process in which the authentication server calculates the first key is as follows:

When the sequence number of the data packet is 1, the authentication server performs calculation by using the first random number and the second random number to obtain a session key; the authentication server performs calculation by using the first public key corresponding to the radio access point to obtain a shared key; and the authentication server performs calculation according to the session key and the shared key to obtain the first key.

When the sequence number of the data packet is not 1, the authentication server performs calculation according to a previous session key and a previous shared key to obtain the first key.

After performing calculation to obtain the first key, the authentication server encrypts, by using the first key, the information sent to the radio access point.

Step 1402b. The radio access point performs calculation according to the first random number, the second random number, and the second public key corresponding to the authentication server, to obtain a second key, and encrypts, by using the second key, information sent to the authentication server.

After receiving the feedback information and the second signature that are sent by the authentication server, the radio access point verifies, according to the second public key corresponding to the authentication server, whether the feedback information is tempered, and when the feedback information is not tempered, performs calculation according to the first random number, the second random number, and the second public key corresponding to the authentication server to obtain the second key. The radio access point encrypts, by using the second key, the information sent to the authentication server.

In some examples, information required by the radio access point to calculate the second key further includes a sequence number of a data packet. The sequence number of the data packet is a sequence number corresponding to the information sent by the radio access point to the authentication server.

For example, when the radio access point sends information to the authentication server for the first time, the sequence number of the data packet is 1. When the radio access point sends information to the authentication server for the second time, the sequence number of the data packet is 2. The rest can be deduced by analogy.

Exemplarily, the process in which the radio access point calculates the second key is as follows:

When the sequence number of the data packet is 1, the radio access point performs calculation by using the first random number and the second random number to obtain a session key; the radio access point performs calculation by using the second public key corresponding to the authentication server to obtain a shared key; and the radio access point performs calculation according to the session key and the shared key to obtain the second key.

When the sequence number of the data packet is not 1, the radio access point performs calculation according to a previous session key and a previous shared key to obtain the second key.

After performing calculation to obtain the second key, the radio access point encrypts, by using the second key, the information sent to the authentication server.

In conclusion, the authentication server encrypts, by using the first key, the information sent to the radio access point, and the radio access point encrypts, by using the second key, the information sent to the authentication server, thereby ensuring security of information transmission between the radio access point and the authentication server.

Figure 15B:
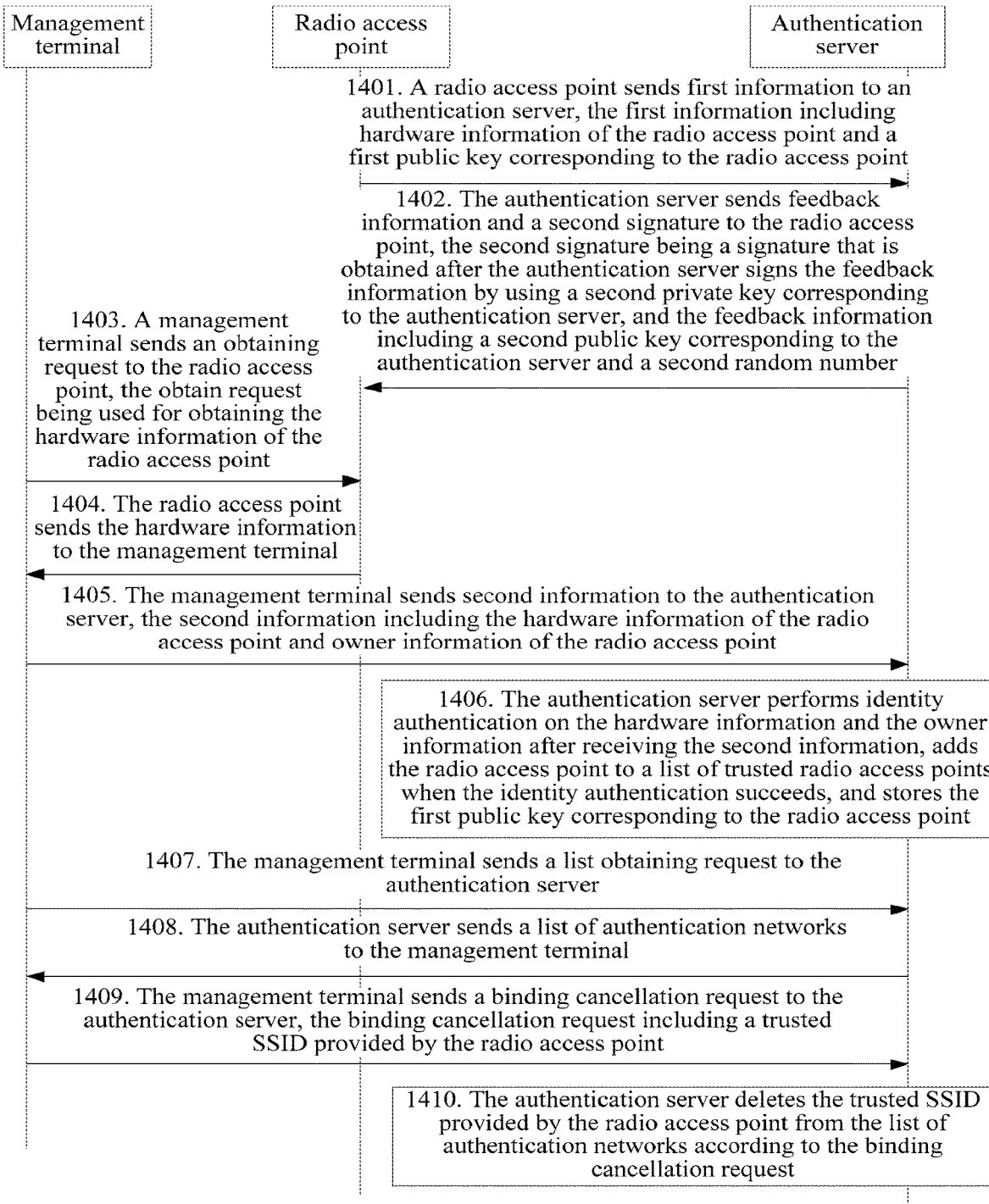
FIG. 15B is a flowchart of a radio access point authentication method according to an embodiment of this application.

Based on the radio access point authentication method shown in FIG. 14, the management terminal may obtain a list of authentication networks in the authentication server by using the authentication server, and deletes the hardware information from the list of authentication networks. That is, after step 1406, the following steps may further be included, as shown in FIG. 15B:

Step 1407. The management terminal sends a list obtaining request to the authentication server.

The list obtaining request is used for obtaining the list of authentication networks in the authentication server, and the list of authentication networks is a list of trusted SSIDs provided by the trusted radio access points.

The management terminal sends a list obtaining request to the authentication server when needing to view or delete an authentication network corresponding to the radio access point. The list obtaining request is used for obtaining the list of trusted SSIDs provided by the trusted radio access points in the authentication server.

In some examples, the list obtaining request carries the identifier of the management terminal. For example, the obtaining request carries openid and an access token after WeChat is logged in to.

For example, the management terminal sends the list obtaining request to the authentication server through a channel whose URL is "http://[domain name]/admin/get-routerlist".

Exemplarily, the list obtaining request sent by the management terminal to the authentication server is shown in Table 8:

TABLE 8

| Field | Type | Description | Note |
|---|---|---|---|
| openid | String | Openid after WeChat is logged in to | |
| token | String | Accesstoken after WeChat is logged in to | |

As shown Table 8, the list obtaining request carries the identifier of the management terminal. The field openid represents the identifier of the management terminal, token represents the access token of the management terminal, and both are of a character string type.

Correspondingly, the authentication server receives the list obtaining request sent by the management terminal.

Step 1408. The authentication server sends a list of authentication networks to the management terminal.

The authentication server sends the list of authentication networks to the management terminal after receiving the list obtaining request. The list of authentication networks is a list of trusted SSIDs provided by trusted radio access points.

Exemplarily, the list of authentication networks sent by the authentication server to the management terminal is shown in Table 9:

TABLE 9

| Field | Type | Description | Note |
|---|---|---|---|
| ret | Int | Return code | |
| msg | String | Text information of return code | |
| mac | String | MAC address of radio access point | If the radio access point supports multiple SSIDs |
| ssid | String | SSID of radio access point | and BSSIDs, create |

TABLE 9-continued

| Field | Type | Description | Note |
|---|---|---|---|
| bssid | String | BSSID of radio access point | arrays routerlist and ssidlist. |
| mark | String | Note of SSID of radio access point | |

As shown in Table 9, the fields represent identifiers of different information. For example, ret represents the return code; msg represents the text information of the return code; mac represents the MAC address of the radio access point; ssid represents the SSID of the radio access point; bssid represents the BSSTD of the radio access point, and if the radio access point supports multiple SSIDs and BSSIDs, arrays ssidlist and routerlist are created, showing multiple SSIDs and BSSIDs; and mark represents the note of the SSID of the radio access point. The type refers to types of all the information in the list of authentication networks, including integral type and character string.

Correspondingly, the management terminal receives the list of authentication networks sent by the authentication server.

Step 1409. The management terminal sends a binding cancellation request to the authentication server, the binding cancellation request including a trusted SSID provided by the radio access point.

The management terminal sends a binding cancellation request to the authentication server after receiving the list of authentication networks, the binding cancellation request including a trusted SSID provided by the radio access point. The binding cancellation request is used for canceling a trusted SSID provided by a corresponding radio access point in the list of authentication networks in the authentication server. For example, the management terminal sends the binding cancellation request to the authentication server through a channel whose URL is "http://[domain name]/admin/unbind".

In some examples, the binding cancellation request further includes the identifier of the management terminal.

Assuming that one radio access point in a list of radio access points includes multiple SSIDs, all or some SSIDs in the radio access point may be canceled according to the binding cancellation request.

The trusted SSID provided by the radio access point and included in the binding cancellation request is an SSID that needs to be canceled in the radio access point.

Exemplarily, the binding cancellation request sent by the management terminal to the authentication server is shown in Table 10:

TABLE 10

| Field | Type | Description | Note |
|---|---|---|---|
| openid | String | Openid after WeChat is logged in to | |
| token | String | Accesstoken after WeChat is logged in to | |
| mac | String | MAC address of radio access point | |
| ssid | String | SSID of radio access point | |
| bssid | String | BSSID of radio access point | |
| ssid2 | String | Second SSID of radio access point | The radio access point supports multiple SSIDs. |
| bssid2 | String | Second BSSID of radio access point | |

As shown in Table 10, the radio access point shown in Table 10 includes two SSIDs. The fields represent identifiers of different information. For example, the field openid represents the identifier of the management terminal, token represents the access token of the management terminal; mac represents the MAC address of the radio access point; ssid represents the SSID of the radio access point; bssid represents the BSSID of the radio access point; ssid2 represents the second SSID of the radio access point; and bssid2 represents the second BSSID of the radio access point. All information in the binding cancellation request is of a type of character string.

Correspondingly, the authentication server receives the binding cancellation request sent by the management terminal.

Step 1410. The authentication server deletes the trusted SSID provided by the radio access point from the list of authentication networks according to the binding cancellation request.

After receiving receive the binding cancellation request, the authentication server obtains the trusted SSID provided by the radio access point and carried in the binding cancellation request, and deletes, according to the hardware information, the trusted SSID provided by the radio access point from the list of authentication networks.

Figure 15C:
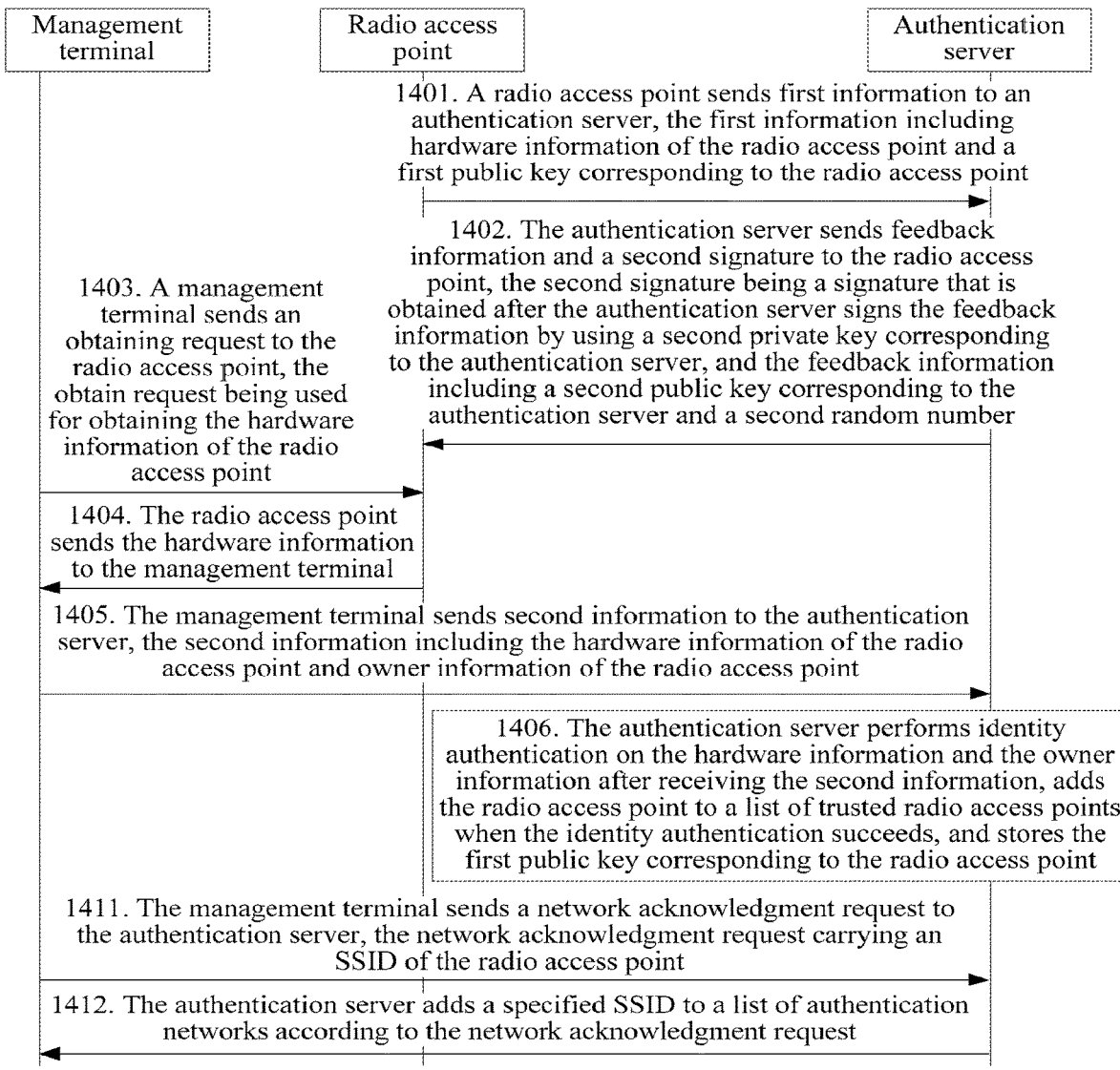
FIG. 15C is a flowchart of a radio access point authentication method according to an embodiment of this application.

Based on the radio access point authentication method shown in FIG. 14, after determining that the SSID of the radio access point is an SSID of an authentication network, the management terminal sends the determined SSID of the radio access point to the authentication server. That is, after step 1406, the following steps may further be included, as shown in FIG. 15C:

Step 1411. The management terminal sends a network acknowledgment request to the authentication server, the network acknowledgment request carrying an SSID of the radio access point.

After connecting to the radio access point by using the authentication server, the management terminal specifies the SSID of the radio access point as an SSID of an authentication network; and adds the specified SSID of the radio access point to a network acknowledgment request, and sends the network acknowledgment request to the authentication server.

For example, the management terminal sends the network acknowledgment request to the authentication server through a channel whose URL is "http://[domain name]/admin/setwifi".

Correspondingly, the authentication server receives the network acknowledgment request sent by the management terminal.

Step 1412. The authentication server adds a specified SSID to a list of authentication networks according to the network acknowledgment request.

After receiving the network acknowledgment request sent by the management terminal, the authentication server obtains the SSID of the radio access point that is specified in the network acknowledgment request. The authentication server adds the specified SSID to the list of authentication networks.

The list of authentication networks is a list of trusted SSIDs provided by trusted radio access points.

Figure 16:
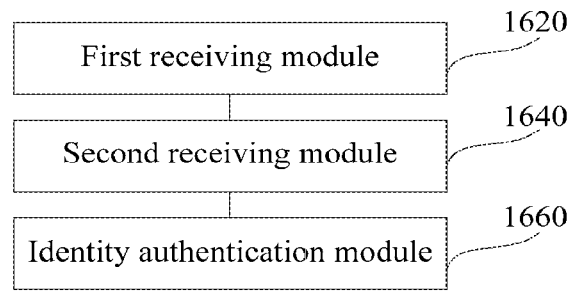
FIG. 16 is a structural block diagram of a radio access point authentication apparatus according to an embodiment of this application.

Referring to FIG. 16, FIG. 16 is a structural block diagram of a radio access point authentication apparatus according to an embodiment of this application. The radio access point authentication apparatus may be implemented to be all or a part of the authentication server in FIG. 11 by using software, hardware, or a combination thereof. The radio access point authentication apparatus includes:

a first receiving module 1620, configured to receive first information sent by the radio access point, the first information including hardware information of the radio access point and a first public key corresponding to the radio access point;

a second receiving module 1640, configured to receive second information sent by a management terminal, the second information including the hardware information of the radio access point and owner information of the radio access point; and an identity authentication module 1660, configured to: perform identity authentication on the hardware information and the owner information after the second information is received, add the radio access point to a list of trusted radio access points when the identity authentication succeeds, and store the first public key corresponding to the radio access point.

In conclusion, by means of the radio access point authentication apparatus provided in this embodiment, first information sent by a radio access point is received; second information sent by a management terminal is received; and identity authentication is performed on hardware information and owner information after the second information is received, the radio access point is added to a list of trusted radio access points when the identity authentication succeeds, and a first public key corresponding to the radio access point is stored. In this way, a problem that both data transmitted by the user terminal to fake public Wi-Fi and data within the user terminal are under security threats because the authentication server considers by default the fake public Wi-Fi as trusted public Wi-Fi in the related authentication method is resolved. Therefore, when the authentication server performs identity authentication on a radio access point, identity authentication performed by the authentication server on a real radio access point can succeed, thereby improving security of both the data transmitted by the user terminal and the data within the user terminal.

Figure 17:
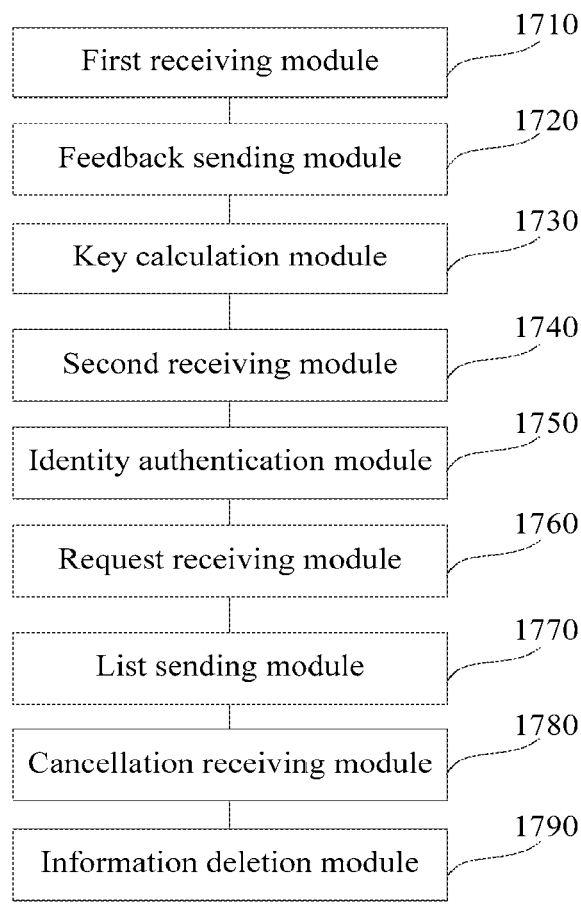
FIG. 17 is a structural block diagram of a radio access point authentication apparatus according to an embodiment of this application.

Referring to FIG. 17, FIG. 17 is a structural block diagram of a radio access point authentication apparatus according to another embodiment of this application. The radio access point authentication apparatus may be implemented to be all or a part of the authentication server in FIG. 11 by using software, hardware, or a combination thereof. The radio access point authentication apparatus includes:

a first receiving module 1710, configured to receive first information sent by the radio access point, the first information including hardware information of the radio access point and a first public key corresponding to the radio access point.

In some examples, in this embodiment, the first receiving module 1710 is further configured to receive the first information and a first signature that are sent by the radio access point, the first signature being a signature that is obtained after the radio access point signs the first information by using a first private key corresponding to the radio access point.

In some examples, the first information further carries a first random number.

In this embodiment, the radio access point authentication apparatus may further include a feedback sending module 1720 and a key calculation module 1730.

The feedback sending module 1720 is configured to send feedback information and a second signature to the radio access point, the second signature being a signature that is obtained after the authentication server signs the feedback information by using a second private key corresponding to the authentication server, and the feedback information including a second public key corresponding to the authentication server and a second random number.

The key calculation module 1730 is configured to: perform calculation according to the first random number, the second random number, and the first public key corresponding to the radio access point, to obtain the first key, and encrypt, by using the first key, information sent to the radio access point.

A second receiving module 1740 is configured to receive second information sent by a management terminal, the second information including the hardware information of the radio access point and owner information of the radio access point.

An identity authentication module 1750 is configured to: perform identity authentication on the hardware information and the owner information after the second information is received, add the radio access point to a list of trusted radio access points when the identity authentication succeeds, and store the first public key corresponding to the radio access point.

In some examples, in this embodiment, the radio access point authentication apparatus may further include a request receiving module 1760 and a list sending module 1770.

The request receiving module 1760 is configured to receive a list obtaining request sent by the management terminal, the list obtaining request being used for obtaining a list of authentication networks in the authentication server, and the list of authentication networks being a list of trusted SSIDs provided by the trusted radio access point.

The list sending module 1770 is configured to send the list of authentication networks to the management terminal.

In some examples, in this embodiment, the radio access point authentication apparatus may further include a cancellation receiving module 1780 and an information deletion module 1790.

The cancellation receiving module 1780 is configured to receive a binding cancellation request sent by the management terminal, the binding cancellation request including a trusted SSID provided by the radio access point.

The information deletion module 1790 is configured to delete the trusted SSID from the list of authentication networks according to the binding cancellation request.

In conclusion, by means of the radio access point authentication apparatus provided in this embodiment, a radio access point sends first information to an authentication server; a management terminal sends second information to the authentication server; and the authentication server performs identity authentication on hardware information and owner information after receiving the second information, adds the radio access point to a list of trusted radio access points when the identity authentication succeeds, and stores a first public key corresponding to the radio access point. In this way, a problem that both data transmitted by the user terminal to fake public Wi-Fi and data within the user terminal are under security threats because the authentication server considers by default the fake public Wi-Fi as trusted public Wi-Fi in the related authentication method is resolved. Therefore, when the authentication server performs identity authentication on a radio access point, identity authentication performed by the authentication server on a real radio access point can succeed, thereby improving security of both the data transmitted by the user terminal and the data within the user terminal.

Moreover, the radio access point performs a first signature on the first information by using a first private key corresponding to the radio access point, and sends the first information and the first signature to the authentication server, so that the first information is not tempered, thereby improving security of the first information.

In addition, the radio access point performs a third signature on some or all of the hardware information and an identifier of the management terminal by using the first private key corresponding to the radio access point, thereby ensuring that the hardware information of the radio access point received by the management terminal is not tempered, and improving data security.

Figure 18:
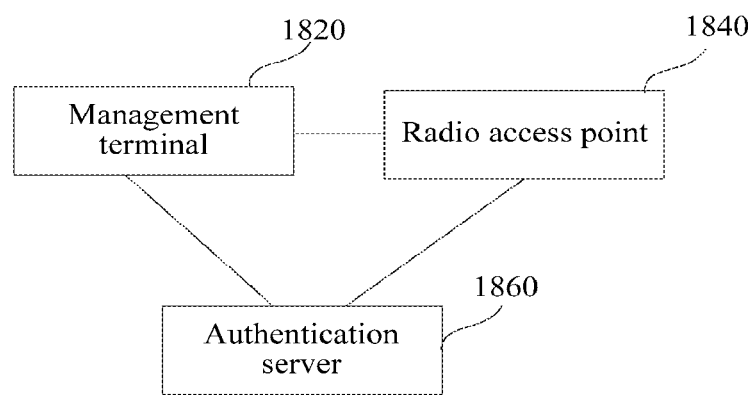
FIG. 18 is a structural block diagram of a radio access point authentication system according to an embodiment of this application.

Referring to FIG. 18, FIG. 18 is a structural block diagram of a radio access point authentication system according to an embodiment of this application. The system includes a management terminal 1820, a radio access point 1840, and an authentication server 1860.

The management terminal 1820 is configured to send second information to the authentication server.

The radio access point 1840 is configured to send first information to the authentication server.

The authentication server 1860 includes the radio access point authentication apparatus according to either of the embodiment shown in FIG. 16 or the embodiment shown in FIG. 17.

It is noted that in the foregoing embodiments, not all the steps and modules are necessary. An execution sequence of the steps may be adjusted as needed. When being connected to a wireless network, the wireless network connection apparatus provided by the foregoing embodiments is described by example by using division of the foregoing function modules. In an actual application, the foregoing functions can be allocated to and completed by different modules as needed, that is, an inner structure of a device is divided into different function modules to implement all or some of the functions described above. In addition, the wireless network connection provided by the foregoing embodiments and the wireless network connection method embodiment belong to one concept. For a specific implementation process thereof, refer to the method embodiment, and details are not described herein again.

The sequence numbers of the preceding embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

What is claimed is:

1. A method for establishing a wireless network connection, comprising:
   receiving, by processing circuitry of an authentication server, an access request sent by a radio access point, the access request carrying user information of a user terminal attempting to access the radio access point;
   determining whether the radio access point is a trusted radio access point after the access request is received;
   performing a first identity authentication on the user terminal when the radio access point is determined to be the trusted radio access point; and
   when the user terminal is authenticated by the first identity authentication,
      generating a master key for the user terminal based on the user information;
      sending, by the processing circuitry of the authentication server, the master key to the user terminal independently of the radio access point; and
      sending, by the processing circuitry of the authentication server, the master key to the radio access point, the radio access point negotiating with the user terminal according to the master key to establish an encrypted wireless network connection.

2. The method according to claim 1, wherein the determining whether the radio access point is the trusted radio access point comprises:
   obtaining a first ciphertext carried in the access request and a first public key being associated with the radio access point, the first public key being paired with a first private key associated with the radio access point;
   checking whether the first public key exists in a set of trusted public keys; and
   determining that the radio access point is the trusted radio access point when the first public key exists in the set of trusted public keys, wherein
   the set of trusted public keys stores public keys associated with radio access points that are authenticated by second identity authentications.

3. The method according to claim 2, wherein the obtaining the first ciphertext carried in the access request and the first public key comprises:
   decrypting the access request by using a second private key associated with the authentication server, to obtain the first ciphertext and the first public key, wherein
   the second private key is paired with a second public key associated with the authentication server; and
   the access request has been encrypted using the second public key associated with the authentication server.

4. The method according to claim 2, wherein the performing the first identity authentication on the user terminal when the radio access point is determined to be the trusted radio access point comprises:
   decrypting the first ciphertext carried in the access request by using the first public key when the radio access point is determined to be the trusted radio access point, to obtain the user information;
   querying key information associated with the user information; and
   performing the first identity authentication on the user terminal according to the key information, wherein
   the first ciphertext is generated at the radio access point by encrypting the user information using the first private key associated with the radio access point.

5. The method according to claim 4, wherein the sending the master key to the radio access point comprises:
   encrypting the master key using the first public key associated with the radio access point to generate a first encrypted master key; and
   sending the first encrypted master key to the radio access point.

6. The method according to claim 5, wherein the sending the first encrypted master key to the radio access point comprises:

encrypting the first encrypted master key using a second private key associated with the authentication server to generate a second encrypted master key; and sending the second encrypted master key to the radio access point.

7. The method according to claim 1, wherein before the receiving the access request sent by the radio access point, the method comprises:

receiving an identity authentication request sent by the radio access point, the identity authentication request carrying authentication information and a first public key associated with the radio access point, both the authentication information and the first public key being encrypted by using a second public key associated with the authentication server, the first public key being paired with a first private key associated with the radio access point, the second public key being paired with a second private key associated with the authentication server, and the authentication information comprising at least hardware information and/or owner information;

decrypting the identity authentication request by using the second private key associated with the authentication server, to obtain the authentication information and the first public key;

performing second identity authentication on the authentication information; and adding the first public key to a set of trusted public keys when the second identity authentication succeeds.

8. The method according to claim 7, wherein the authentication information is generated at the radio access point by an encryption using the first private key associated with the radio access point, and the performing the second identity authentication on the authentication information comprises:

decrypting the authentication information by using the first public key; to obtain the hardware information and/or the owner information;

performing the second identity authentication on the hardware information and/or the owner information; and adding the first public key to the set of trusted public keys when the second identity authentication succeeds.

9. The method according to claim 1, further comprising:

receiving first information sent by the radio access point; the first information comprising hardware information of the radio access point and a first public key associated with the radio access point, the first public key being paired with a first private key associated with the radio access point;

receiving second information sent by a management terminal, the second information comprising the hardware information of the radio access point and owner information of the radio access point;

performing identity authentication based on the hardware information and the owner information after the second information is received;

adding the radio access point to a list of trusted radio access points when the identity authentication succeeds; and storing, at the authentication server, the first public key associated with the radio access point.

10. The method according to claim 9, wherein the receiving the first information sent by the radio access point comprises:

receiving the first information and a first signature that are sent by the radio access point, the first signature being generated at the radio access point by signing the first information using the first private key associated with the radio access point.

11. The method according to claim 10, wherein the first information further includes a first random number; and after the receiving the first information and the first signature that are sent by the radio access point, the method further comprises:

generating feedback information that includes a second random number and a second public key associated with the authentication server, the second public key being paired with a second private key associated with the authentication server;

generating, at the authentication server, a second signature by signing the feedback information using the second private key;

sending the feedback information and the second signature to the radio access point; and performing a calculation according to the first random number, the second random number, and the first public key associated with the radio access point, to obtain a first key; and encrypting, by using the first key, information sent to the radio access point.

12. The method according to claim 9, after the adding the radio access point to the list of trusted radio access points, the method further comprising:

receiving a request for authenticated networks that is sent by the management terminal;

obtaining a list of trusted service set identifiers (SSIDs) as a list of the authenticated networks, the trusted SSIDs being provided by the trusted radio access points; and sending the list of authenticated networks to the management terminal.

13. The method according to claim 12, after the sending the list of the authenticated networks to the management terminal, further comprising:

receiving a binding cancellation request sent by the management terminal, the binding cancellation request comprising a trusted SSID; and deleting the trusted SSID from the list of the authenticated networks according to the binding cancellation request.

14. A method for accessing a wireless network, comprising:

receiving, at a radio access point, a first access request sent by a user terminal, the first access request carrying user information of the user terminal;

sending, from the radio access point, a second access request to an authentication server, the second access request carrying the user information;

receiving a master key sent by the authentication server, the master key being associated with the user information and being sent to the user terminal by the authentication server independently of the radio access point in response to the second access request, when the radio access point is determined to be a trusted radio access point, and the user terminal is authenticated by a first identity authentication; and negotiating with the user terminal according to the master key to establish an encrypted wireless network connection.

15. The method according to claim 14, wherein the receiving the master key sent by the authentication server comprises:

receiving a first encrypted master key sent by the authentication server, the authentication server encrypting the master key using a first public key associated with the radio access point to generate the first encrypted master key, the first public key being paired with a first private key associated with the radio access point.

16. The method according to claim 14, wherein the receiving the master key sent by the authentication server comprises:
receiving a second encrypted master key sent by the authentication server, the authentication server encrypting the master key using a first public key associated with the radio access point to generate a first encrypted master key and encrypting the first encrypted master key using a second private key associated with the authentication server to generate the second encrypted master key, the first public key being paired with a first private key associated with the radio access point, and the second private key being paired with a second public key associated with the authentication server.

17. The method according to claim 15, wherein the negotiating with the user terminal according to the master key to establish the encrypted wireless network connection comprises:
decrypting, at the radio access point, the first encrypted master key using the first private key associated with the radio access point, to obtain the master key; and
negotiating with the user terminal according to the master key to establish the encrypted wireless network connection.

18. The method according to claim 16, wherein the negotiating with the user terminal according to the master key to establish the encrypted wireless network connection comprises:
decrypting the second encrypted master key using the second public key associated with the authentication server, to obtain the first encrypted master key;
decrypting the first encrypted master key by using the first private key associated with the radio access point, to obtain the master key; and
negotiating with the user terminal according to the master key to establish the encrypted wireless network connection.

19. The method according to claim 14, before the sending the second access request to the authentication server, thy: method comprising:
generating, at the radio access point, a pair of a first public key and a first private key associated with the radio access point;
obtaining a second public key associated with the authentication server; and
sending an identity authentication request to the authentication server, the identity authentication request carrying authentication information and the first public key associated with the radio access point, both the authentication information and the first public key corresponding to the radio access point being encrypted using the second public key associated with the authentication server, and the authentication information comprising at least hardware information and/or owner information.

20. The method according to claim 19, wherein the authentication information is encrypted using the first private key associated with the radio access point.

21. The method according to claim 14, wherein the negotiating with the user terminal according to the master key to establish the encrypted wireless network connection comprises:
negotiating with the user terminal by using the master key to establish a temporary key for a connection session; and
establishing the encrypted wireless network connection to the user terminal according to the temporary key.

22. An apparatus, comprising:
interface circuitry configured to receive signals from and transmit signals to a radio access point and a user terminal via a network; and
processing circuitry configured to:
receive, via the interface circuitry, an access request sent by the radio access point, the access request carrying user information of the user terminal attempting to access the radio access point;
determine whether the radio access point is a trusted radio access point after the access request is received;
perform a first identity authentication on the user terminal where the radio access point is determined to be the trusted radio access point; and
when the user terminal is authenticated by the first identity authentication,
generate a master key for the user terminal based on the user information;
send, via the interface circuitry, the master key to the user terminal independently of the radio access point; and
send, via the interface circuitry, the master key to the radio access point, the radio access point negotiating with the user terminal according to the master key to establish an encrypted wireless network connection.

23. The apparatus according to claim 22, wherein the processing circuitry is configured to:
obtain a first ciphertext carried in the access request and a first public key being associated with the radio access point, the first public key being paired with a first private key associated with the radio access point;
check whether the first public key exists in a set of trusted public keys, the set of trusted public keys storing public keys associated with radio access points that are authenticated by second identity authentications; and
determine that the radio access point is the trusted radio access point when the first public key exists in the set of trusted public keys.

24. The apparatus according to claim 23, wherein the processing circuitry is configured to:
decrypt the access request by using a second private key associated with the apparatus to obtain the first ciphertext and the first public key, the second private key being paired with a second public key associated with the apparatus, and the access request being encrypted using the second public key associated with the apparatus.

25. The apparatus according to claim 23, wherein the processing circuitry is configured to:
decrypt the first ciphertext carried in the access request by using the first public key when the radio access point is determined to be the trusted radio access point, to obtain the user information;
query key information associated with the user information; and
perform the first identity authentication on the user terminal according to the key information, the first ciphertext being generated at the radio access point by encrypting the user information using the first private key associated with the radio access point.

26. The apparatus according to claim 25, wherein the processing circuitry is configured to:
encrypt the master key using the first public key associated with the radio access point to generate a first encrypted master key;
encrypt the first encrypted master key using a second private key associated with the apparatus to generate a second encrypted master key; and
send, via the interface circuitry, the second encrypted master key to the radio access point.

27. The apparatus according to claim 22, wherein the processing circuitry is configured to:
receive, via the interface circuitry, an identity authentication request sent by the radio access point before receiving the access request, the identity authentication request carrying authentication information and a first public key associated with the radio access point, both the authentication information and the first public key being encrypted by using a second public key associated with the apparatus, the first public key being paired with a first private key associated with the radio access point, the second public key being paired with a second private key associated with the apparatus, and the authentication information comprising at least hardware information and/or owner information;
decrypt the identity authentication request by using the second private key associated with the apparatus, to obtain the authentication information and the first public key;
perform second identity authentication on the authentication information; and
add the first public key to a set of trusted public keys when the second identity authentication succeeds.

28. The apparatus according to claim 22, wherein the processing circuitry is configured to:
receive, via the interface circuitry, first information sent by the radio access point, the first information comprising hardware information of the radio access point and a first public key associated with the radio access point, the first public key being paired with a first private key associated with the radio access point;
receive, via the interface circuitry, second information sent by a management terminal, the second information comprising the hardware information of the radio access point and owner information of the radio access point;
perform identity authentication based on the hardware information and the owner information after the second information is received;
add the radio access point to a list of trusted radio access points when the identity authentication succeeds; and
store the first public key associated with the radio access point.

29. An apparatus, comprising:
first interface circuitry configured to receive wireless signals from and transmit wireless signals to a user terminal;
second interface circuitry configured to receive signals from and transmit signals to an authentication server via a network; and
processing circuitry configured to:
receive, via the first interface circuitry; a first access request sent by the user terminal, the first access request carrying user information of the user terminal;
send, via the second interface circuitry, a second access request to thy: authentication server, the second access request carrying the user information;
receive, via the second interface circuitry, a master key sent by the authentication server, the master key being associated with the user information and being sent to the user terminal by the authentication server independently of the apparatus in response to the second access request when the apparatus is determined to be a trusted radio access point, and the user terminal is authenticated by a first identity authentication; and
negotiate, via the first interface circuitry, with the user terminal according to the master key to establish an encrypted wireless network connection.

30. The apparatus according to claim 29, wherein the processing circuitry is configured to:
receive, via the second interface circuitry, a first encrypted master key that is encrypted by the authentication server using a first public key associated with the apparatus, the first public key being paired with a first private key associated with the apparatus;
decrypt the first encrypted master key using the first private key associated with the apparatus, to obtain the master key; and
negotiate with the user terminal according to the master key to establish the encrypted wireless network connection.

31. The apparatus according to claim 29, wherein the processing circuitry is configured to:
receive, via the second interface circuitry, a second encrypted master key that is encrypted by the authentication server, the authentication server encrypting the master key using a first public key associated with the apparatus to generate a first encrypted master key and encrypting the first encrypted master key using a second private key associated with the authentication server to generate the second encrypted master key, the first public key being paired with a first private key associated with the apparatus, and the second private key being paired with a second public key associated with the authentication server;
decrypt the second encrypted master key using the second public key associated with the authentication server, to obtain the first encrypted master key;
decrypt the first encrypted master key by using the first private key associated with the apparatus, to obtain the master key; and
negotiate with the user terminal according to the master key to establish the encrypted wireless network connection.

32. A non-transitory computer-readable medium storing instructions which when executed by a processor of an authentication server, cause the processor to perform a method for establishing a wireless network connection, the method comprising:
receiving an access request sent by a radio access point, the access request carrying user information of a user terminal attempting to access the radio access point;
determining whether the radio access point is a trusted radio access point after the access request is received;
performing a first identity authentication on the user terminal when the radio access point is determined to be the trusted radio access point; and
when the user terminal is authenticated by the first identity authentication, generating a master key for the user terminal based on the user information;

sending the master key to the user terminal independently of the radio access point; and sending the master key to the radio access point, the radio access point negotiating with the user terminal according to the master key to establish an encrypted wireless network connection.

33. A non-transitory computer-readable medium storing instructions which when executed by a processor of a radio access point, cause the processor to perform a method for establishing a wireless network connection, the method comprising:

receiving a first access request sent by a user terminal, the first access request carrying user information of the user terminal;

sending, from the radio access point, a second access request to an authentication server, the second access request carrying the user information;

receiving a master key sent by the authentication server, the master key being associated with the user information and being sent to the user terminal by the authentication server independently of the radio access point in response to the second access request, when the radio access point is determined to be a trusted radio access point, and the user terminal is authenticated by a first identity authentication; and negotiating with the user terminal according to the master key to establish an encrypted wireless network connection.

* * * * *